US006993562B2

(12) United States Patent
Treptow et al.

(10) Patent No.: US 6,993,562 B2
(45) Date of Patent: Jan. 31, 2006

(54) METHOD AND SYSTEM TO PRINT VIA EMAIL

(75) Inventors: Jay A. Treptow, Maple Valley, WA (US); Gregory H. Wong, Torrance, CA (US); Kristofer P. Henderson, Seattle, WA (US); Thomas A. Cocotis, Huntington Beach, CA (US)

(73) Assignee: Peerless Systems Corporation, El Segundo, CA (US)

( * ) Notice: Subject to any disclaimer, the term of this patent is extended or adjusted under 35 U.S.C. 154(b) by 322 days.

(21) Appl. No.: 10/104,528

(22) Filed: Mar. 21, 2002

(65) Prior Publication Data

US 2003/0182378 A1 Sep. 25, 2003

(51) Int. Cl.
G06F 15/16 (2006.01)

(52) U.S. Cl. ..................................... 709/206; 328/3.23
(58) Field of Classification Search ................ 709/366, 709/217, 218, 219, 206; 358/1.15
See application file for complete search history.

(56) References Cited

U.S. PATENT DOCUMENTS

| | | | |
|---|---|---|---|
| 5,805,810 A | | 9/1998 | Maxwell |
| 5,826,269 A | | 10/1998 | Hussey |
| 5,848,261 A | * | 12/1998 | Farry et al. .................. 703/23 |
| 5,873,659 A | * | 2/1999 | Edwards et al. .............. 400/61 |
| 5,974,449 A | * | 10/1999 | Chang et al. ................ 709/206 |
| 6,005,928 A | | 12/1999 | Johnson |
| 6,266,150 B1 | | 7/2001 | Brossman et al. |
| 6,449,052 B1 | * | 9/2002 | Sherer et al. ............... 358/1.13 |
| 6,542,892 B1 | * | 4/2003 | Cantwell .................... 707/10 |
| 6,705,781 B2 | * | 3/2004 | Iwazaki ....................... 400/62 |
| 2002/0191210 A1 | * | 12/2002 | Staas et al. ................. 358/1.15 |
| 2003/0067624 A1 | * | 4/2003 | Anderson et al. .......... 358/1.15 |

FOREIGN PATENT DOCUMENTS

| | | | |
|---|---|---|---|
| EP | 0 855 821 | * | 7/1998 |
| EP | 0 950 969 | * | 10/1999 |
| WO | WO 00/72129 A1 | * | 11/2000 |

OTHER PUBLICATIONS

RFC 1486, Network Working Group, Malamud, C. et. al., Oct. 1993, pp. 1-12.*
Troy Internet Print Servers, Quick Install Manual, Troy Group, Inc. pp. 1-62.*

(Continued)

Primary Examiner—Beatriz Prieto
(74) Attorney, Agent, or Firm—Blakely, Sokoloff, Taylor & Zafman

(57) ABSTRACT

A system and method that enables users operating originating devices, such as PC's, laptop computers, PDA's, pocket PC's, cell phones, etc., to print documents, images, etc. by sending the content to be printed via an e-mail message. The e-mail message is sent to a virtual printer e-mail address hosted by an e-mail server. The e-mail message is retrieved by a "driverless" print server (DPS) system, separated into a main file and attachment files, and printed on a printer to which the virtual printer e-mail address corresponds. The DPS system utilizes a table driven mechanism to determine appropriate applications to laod and process and handle various printer events generated by various software applications pertaining to the documents desired to be printed by operators of the originating devices. The system and method enable documents and the like to be printed without requiring a printer device driver corresponding to the target printer to be loaded on the originating device.

48 Claims, 16 Drawing Sheets

OTHER PUBLICATIONS

Print Server User Guide P/N 9570220101, 1997, pp. 1-122□□□□□□.*

Etherwind, 802.11B Print Server, User's Guide, Troy Group, Inc. Rev 1.0, 2001□□.*

PCT/US02/14859 Search Report (Sep. 17, 2002).

* cited by examiner

METHOD AND SYSTEM TO PRINT VIA EMAIL

BACKGROUND OF THE INVENTION

1. Field of the Invention

The present invention concerns computer printing in general, and in particular concerns a system and method that enables uses to print out documents and the like on a printer through use of e-mail messages.

2. Background Information

Typically, in order to print out a document, it is necessary for an originating device, such as a personal computer (PC), laptop computer, personal digital assistant (PDA), pocket PC, etc., to have a printer device driver loaded prior to being able to print. The printer device driver provides an abstracted interface between the operating system (OS) and a specific printer to enable the operating system (and applications running on the OS) to communicate with any printer supported by the OS using a common set of text, graphic, and layout commands. This enables developers to develop applications without having to be concerned (generally) with the specific operations of the various printers that may be used with the application. These specific operations are handled by the OS in combination with the printer device drivers.

In today's mobile business environments, business people often encounter situations in which they are away from their home office, yet need to be able to print out documents at either a nearby printer or a selected printer proximate to a business contact they wish to provide one or more documents to. Generally, in order to print to either printer, two things need to happen. First, a mobile computing device on which the document files are stored (or through which they may be accessed) must be linked in communication with the destination printer. This may typically be performed by connecting to a network to by which the printer may be accessed, or by directly connecting to the printer via a printer cable (e.g., serial, parallel, or USB cable). In many cases, both of these connection solutions may be impractical or unavailable. For instance, many business printers are designed to be connected to a network and administrators do not want their network connection disrupted by connecting the printer to the originating mobile computing device via a printer cable. Furthermore, the network to which the printer is connected may be a private network that the administrator will not allow "foreign" computers to be connected to.

The second half of the foregoing problem pertains to the printer device driver. As discussed above, in order for the mobile computing device to be able to print via a printer, an appropriate printer device driver must be loaded on mobile computing device. In general, a specific device driver will be required for each unique type of printer (even unique models within a similar line of printers). These drivers take time to load, occupy stored space, and may cause software conflicts with other applications on the mobile computing device. Additionally, the business person may not have access to the needed driver. In some instances, a suitable printer driver may be available via the media from which the OS was originally installed, which people generally don't carry with them when away from the office. Oftentimes, the printer will comprise a model that was made available after the OS was released, whereby the only way to load the appropriate driver is to have a specific device driver that was provided with the printer. Short of being able to download the specific driver via the Internet, the business person will simply be out of luck, having no way to print via the destination printer.

SUMMARY OF THE INVENTION

The present invention provides a system and method for allowing communications between various originating devices operating various operating systems across various networks to enable the originating devices to print documents via a "driverless" print server system without requiring any printing device drivers to be loaded on the originating device. The server system utilizes a table driven mechanism to process and handle various printer events generated by various software applications pertaining to the documents desired to be printed by operators of the originating devices. Output is then directed over various networks to a selected target printer. The server system provides two-way communication between the server and the originating device as well as two-way communication between the server and the target printers.

In a typical implementation, a user operating an originating device, such as a PC, laptop, PDA, pocket PC, cell phone, etc., accesses the Driverless Print Server (DPS) system by sending an e-mail message to a "virtual" printer e-mail address corresponding to a "target" printer the user would like source data contained in or attached to the e-mail message (e.g., a document file) to be printed on. The DPS system retrieves e-mail sent to one or more virtual printer e-mail addresses corresponding to printers hosted by the system, and processes each e-mail to print its source data on the printer corresponding to the virtual printer e-mail address to which that message was sent.

Processing the e-mail includes separating the main body of the e-mail and any attachments into separate files, and submitting a job request for each file. When processing the job request, a file type of the file is determined, and the file is loaded into an appropriate application or browser or directly sent to a printer spooler. A print action is then invoked to cause printer data to be generated via the application or browser in combination with a print subsystem of the operating system on which the application or browser runs. The printer data is then sent to the target printer to be printed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

Figure 1:
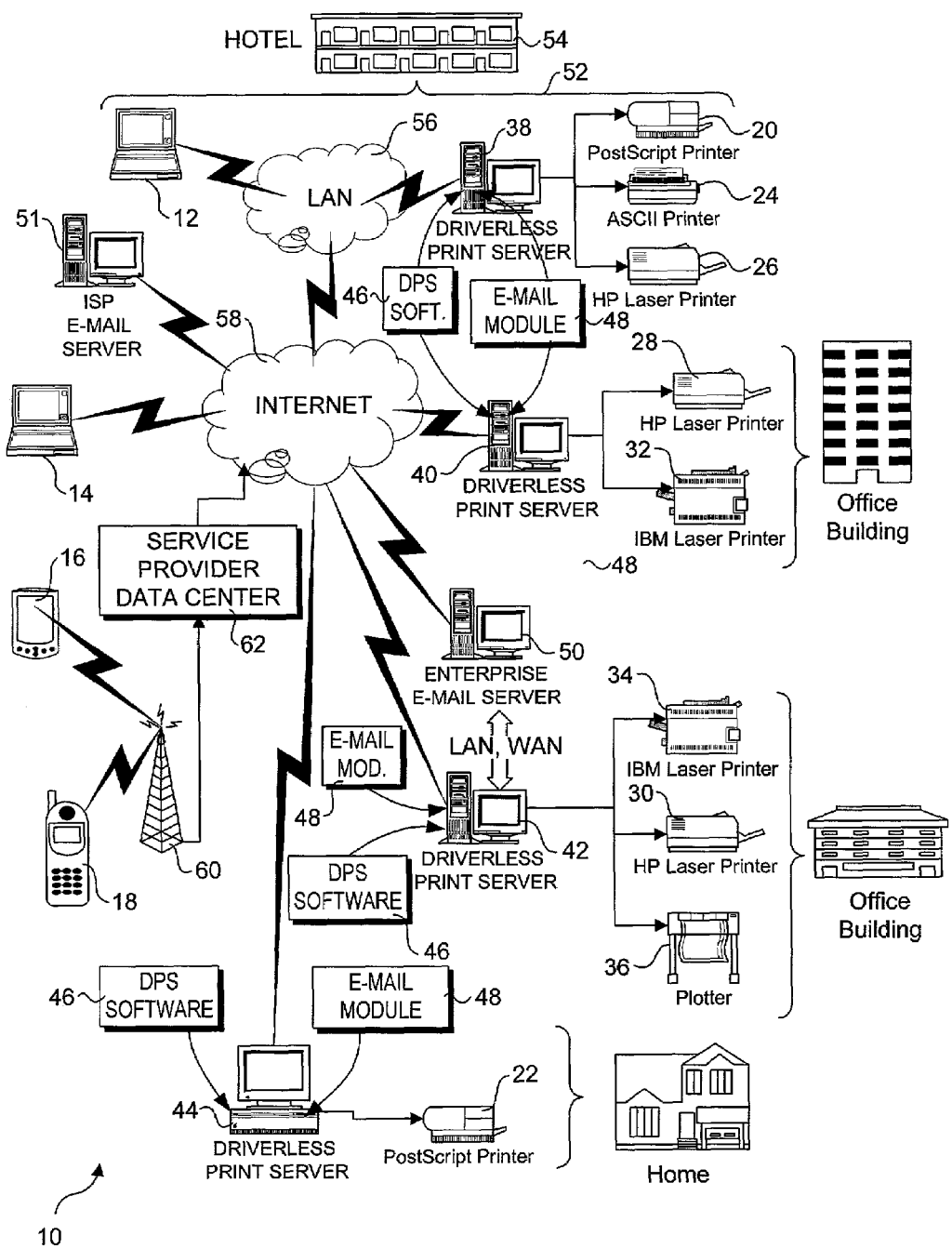
FIG. 1 is a schematic diagram of exemplary infrastructure in accordance with one embodiment of the invention that enables users of various originating devices to print documents on selected target printers via e-mail messages that are sent to virtual printer e-mail addresses, retrieved, and processed by "driverless" print server (DPS) system.

A system and method for that enables users operating originating devices to print documents, images, and Web pages via a "driverless" print server (DPS) system by sending source data corresponding to the object(s) to be printed in an e-mail message is described in detail herein. In the following description, numerous specific details are disclosed, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Terminology

The following discussion discloses embodiments in accordance with the invention for implementing driverless print services, whereby originating devices may submit documents to be printed on targeted printers over both private and public networks. In accordance with the disclosed embodiments, the following terms are used:

Server: A computer running software that is accessible over a network.

Web Server: A software program running on a computer or server, which communicates with client computers using the HyperText Transmission Protocol (HTTP) to transmit HyperText Markup Language (HTML) files, Common Gateway Interface (CGI) data, and data files between the client and server computers.

Web Browser: A software application for getting and posting resources over the network, and for rendering content.

Universal Resource Locator (URL): A HTTP address string of a resource on a network. This is usually a Web page or document file.

Source Data: The source data in this document refers to any document or media that can be retrieved and output to a device. The supported input data formats include but are not limited to most of the document processor supported types (e.g. PDF, PostScript, Microsoft Word), Web URL link, e-mail, or e-mail attachment.

Job Request: This refers to a request that a user submits to the system to be processed and sent to an Output Device.

Job Status: This refers to the status of a job request that indicates the current progress of the request processing. It is a mechanism to help users understand the status of their job requests and to help the system administrators to administer them.

Printer: A hardware device that takes an electronic stream of data and creates an image on media such as paper (e.g., a hard copy output of a document).

Windows Printer: In the Microsoft Windows Operating systems, a 'Printer' is defined as the named combination of a printer driver, print processor, language monitor, and port monitor.

Spool File: A printer language file that is created by a MS Windows printer driver. The content of this file is sent directly to the printer for printing.

Internet Printing Protocol (IPP): A protocol similar to HTTP for sending spool files to, and getting print job status from, a networked printer.

Line Printer Remote (LPR): A protocol for submitting spool files to a networked printer.

Infrastructure Overview

An overview of a network infrastructure 10 corresponding to an exemplary implementation of the invention is shown in FIG. 1. Network infrastructure 10 depicts four originating devices, including laptop computers 12 and 14, a PDA 16, and a cell phone 18. It will be understood that an originating device may include any device that may send an e-mail message to an e-mail address, including but not limited to PC's, workstations, laptop computers, PDA's, pocket PC's, cell phones, wireless two-way pagers (e.g., Blackberry devices), and Web TV appliances. Each of the originating devices may access any target printer that is supported by a Driverless Print Server site via a "virtual" e-mail address for that printer. Such target printers depicted in FIG. 1 include PostScript printers and 22, an ASCII line printer 24, Hewlett-Packard (HP) laser printers 26, 28, and 30, IBM laser printers 32 and 34, and a plotter 36. In general, any type of printer or plotter may be used as a target printer. As such, the printers and plotter in FIG. 1 are for illustrative purposes only, and are not meant to limit the types of printers that may be implemented in accordance with the invention.

Each target printer will be connected to a Driverless Print Server computer, as depicted by Driverless Print Server computers 38, 40, 42 and 44. A Driverless Print Server computer comprises a set of DPS software modules 46 (also referred to herein a the Driverless Print Server or the Driverless Print Server software) operating on a computing device, such as a PC, workstation, laptop, or computer server. As described in further detail below, the Driverless Print Server software in combination with an e-mail module 48 enables a user of an originating device to request to have one or more hard copy output documents produced at a target printer by sending an e-mail message with optional attachments to the virtual address for that target printer, wherein the hard copy output documents pertain to the e-mail message and any attachment that is sent with the message. In general, e-mail messages may be accessed from any e-mail server to which a Driverless Print Server computer may download e-mail messages from, such as enterprise e-mail server 50, which may typically be accessed via a LAN or wide area network (WAN), or the e-mail server may be hosted by an Internet Service Provider (ISP) that is accessed via the Internet, as depicted by ISP e-mail server 51. Optionally, e-mail server software may be installed on the Driverless Print Server computer.

As shown by a grouping bracket 52, laptop computer 12, Driverless Print Server computer 38, and printers 20, 24, and 26 are depicted to reside at a common physical location, such as a hotel 54. In a typical "hospitality" implementation, a printing service provider, such as a hotel, airport, copy center, etc., may provide a local area network (LAN) such as LAN 56 that allows originating devices to directly send e-mail messages over the LAN to an e-mail server, wherein the messages may be retrieved by a Driverless Print Server and printed on any associated printer provided by the hospitality site.

As illustrated in FIG. 1, typical DPS sites also include office and home sites. In instances in which the DSP host computer comprises a mobile computer, the DPS site may be located anywhere there is an appropriate network connection and access to a corresponding e-mail server is available (or such e-mail server services are provided by software operating on the mobile computer).

In the case or wireless devices such as PDA 16 and cell phone 18, the wireless device will typically be able to send an receive e-mail messages via a cellular network 60 that will include a service provider data center 62 that provides e-mail support services for wireless service subscribers (i.e., users of PDA 16 and cell phone 18. The service provider data center is connected to Internet 56 to enable messages to be delivered from the service provider data center to destination e-mail addresses.

Figure 2:
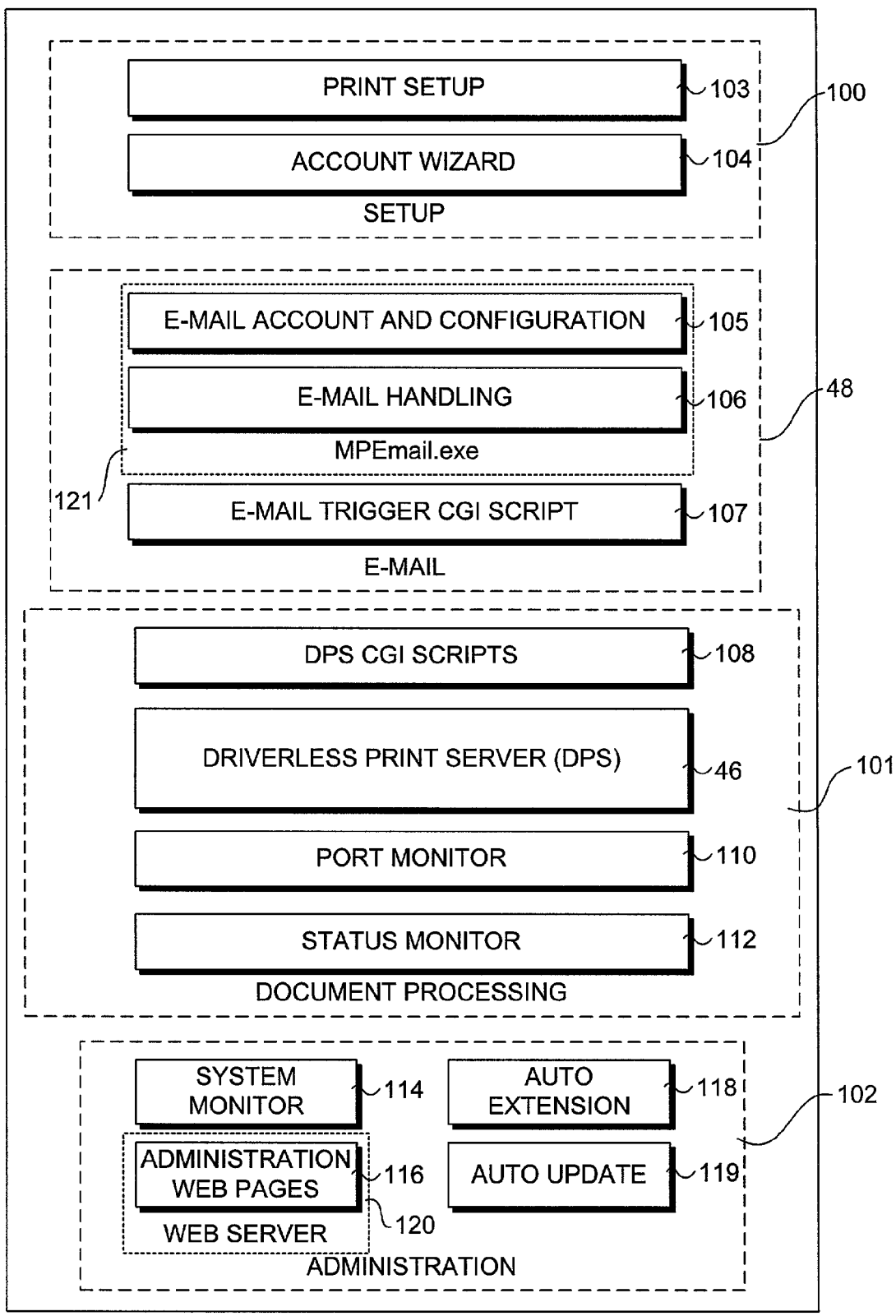
FIG. 2 is a block schematic diagram illustrating various software components that are used to provide the operations provided by the DPS system in accordance with one embodiment of the invention.

Further details of one embodiment of the software components by which the invention may be implemented are shown in FIG. 2. The software components are logically divided into four groups, including a setup component 100, an e-mail module 48, a document processing component 101, and an administration component 102. Each of these components further include a plurality of software applications, scripts, components and/or modules. Setup component 100 includes a Print Setup module 103 and an Account Wizard module 104. E-mail module 48 includes an e-mail account and configuration module 105, an e-mail handling component 106, and an E-mail Trigger Common Gateway Interface (CGI) script 107. Document processing component 100 includes DPS CGI scripts 108, a Driverless Print Server module 46, a Port Monitor 110, and a Status Monitor 112. Administration component 102 includes a System Monitor 114, administration web pages 116, an auto extension module 118, and an auto update module 119.

In general, administration web servers will be served via a web server. In one embodiment, the web server comprises a portion of the software running on the Driverless Print Server computer, as depicted by web server component 120. Optionally, the web server may run on a separate machine that is linked to the DPS computer in an n-tier configuration, as will be recognized by those skilled in the distributed processing art.

In one embodiment, Print Setup module 103 comprises a Microsoft (MS) Windows application run by a system administrator to change the configuration of a Windows Printer that is used by the system. The application may be used to convert and existing printer, install a new printer, or delete a printer. Conversion of an existing printer comprises taking an existing printer installation and replacing the operations provided by MS Window's port monitor with Port Monitor 110. The use of Port Monitor 110 allows the spool file to be manipulated by the DPS system and allows Status Monitor 112 to send the spool file to a selected target printer.

Print Setup module 103 may also be used to install a new printer with an appropriate printer device driver. For example, an administrator can set up a postscript printer by installing an Adobe PostScript™ driver for use with the DPS system by using the printer's PostScript Printer Description (PPD) file. If the administrator can provide a PDD, the printer setup module will install the PostScript driver and configure it for use by the DPS system. In other cases, the administrator may provide appropriate printer device driver software for the new printer.

Print Setup module 103 may also be used to delete a printer. In such an event, the Windows port monitor can be restored as the system's port monitor or a DPS server's support for a selected printer can be completely removed.

Account wizard module 104 applies security to a set of Administrative Control Panel Web page files so that the administrator's login will determine which set of Web pages are accessible. In one embodiment, the system implements three administrative levels, including monitor, manager, and administrative levels. In one embodiment, the account wizard creates these three groups as MS Windows user groups. Furthermore, the account wizard creates MS Windows user accounts and places them into one of the administrative user groups. In one embodiment, account wizard module 104 comprises an MS Windows application.

In one embodiment, the operations provided by e-mail account and printer setup component 105 and e-mail handling component 106 are implemented by a MS Windows application named MPEmail.exe (MPEmail application 121) that is run on the Driverless Print Server computer. MPEmail application 121 comprises a Win32 application with a dialog box user interface (UI). Menu items on the main window provide entry to various dialog boxes for setting up e-mail accounts and configuring the e-mail module. As described in further detail below, the MPEmail application operates by retrieving the mail from an e-mail account via the Post Office Protocol version 3 (POP2). The retrieved main is then submitted to Driverless Print Server 46 for printing.

Figure 3:
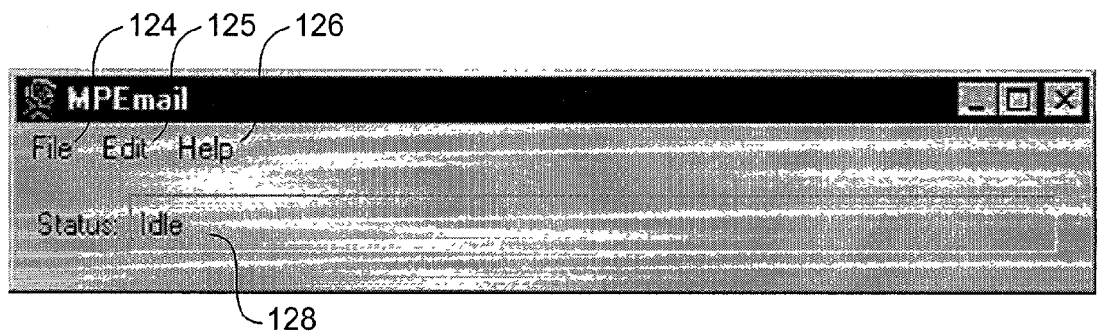
FIG. 3 is a representation of a main user-interface corresponding to an MPEmail application that is used by the DPS system to configure the system and handle e-mail messages that are sent to the virtual printer e-mail addresses.

A representation of a main UI 122 for MPEmail application 121 is shown in FIG. 3. Main UI 122 provides a menu bar that includes a File pulldown menu 124, an Edit pulldown menu 125, and a Help pulldown menu 126. The UI further includes a status text box 128 in which the status of the application is displayed. Since the UI runs on the Driverless Print Server computer, is may be accessed only be an administrator, and is not accessible to consumer users.

To support e-mail printing, the following must be configured for each target printer: 1) an e-mail account, with POP3 access, to serve as a virtual e-mail address for the printer; 2) a printer configured to print with the Driverless Print Server system; and 3) a configured MPEmail account, which ties the e-mail address to the target printer.

In general, the e-mail account may be any e-mail account that supports e-mail access via the POP3 protocol. It will be recognized by those skilled in the art that other e-mail protocols may also be used if corresponding modifications are made to e-mail module 48 to support those protocols. The setup of a specific account is outside the scope of the present invention. The target printer setup may be performed via dialog boxes providing by the MPEmail UI.

Figure 4:
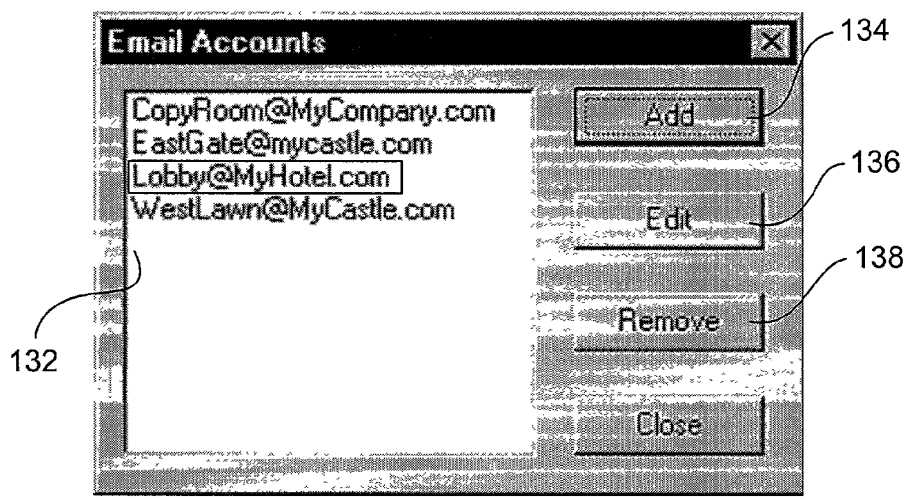
FIG. 4 is a representation of an E-mail Accounts dialog box that enables E-mail accounts for the virtual printer e-mail address to be configured.

To view existing, edit existing, or create new MPEmail accounts, the administrator will activate Edit pulldown menu 126 and select the accounts option (not shown). This will launch an e-mail accounts dialog box 130, as shown in FIG. 4. Any existing e-mail accounts will appear in a selectable text box 132. A new e-mail account may be added via activation of an "Add" button 134. An existing e-mail account may be edited by selecting the desired account in selectable text box 132 (e.g., by clicking on the account entry in the displayed list of accounts) and activating an "Edit" button 136. Similarly, an existing e-mail account may be removed by selecting the account and activating a "Remove" button 138.

Figure 5:
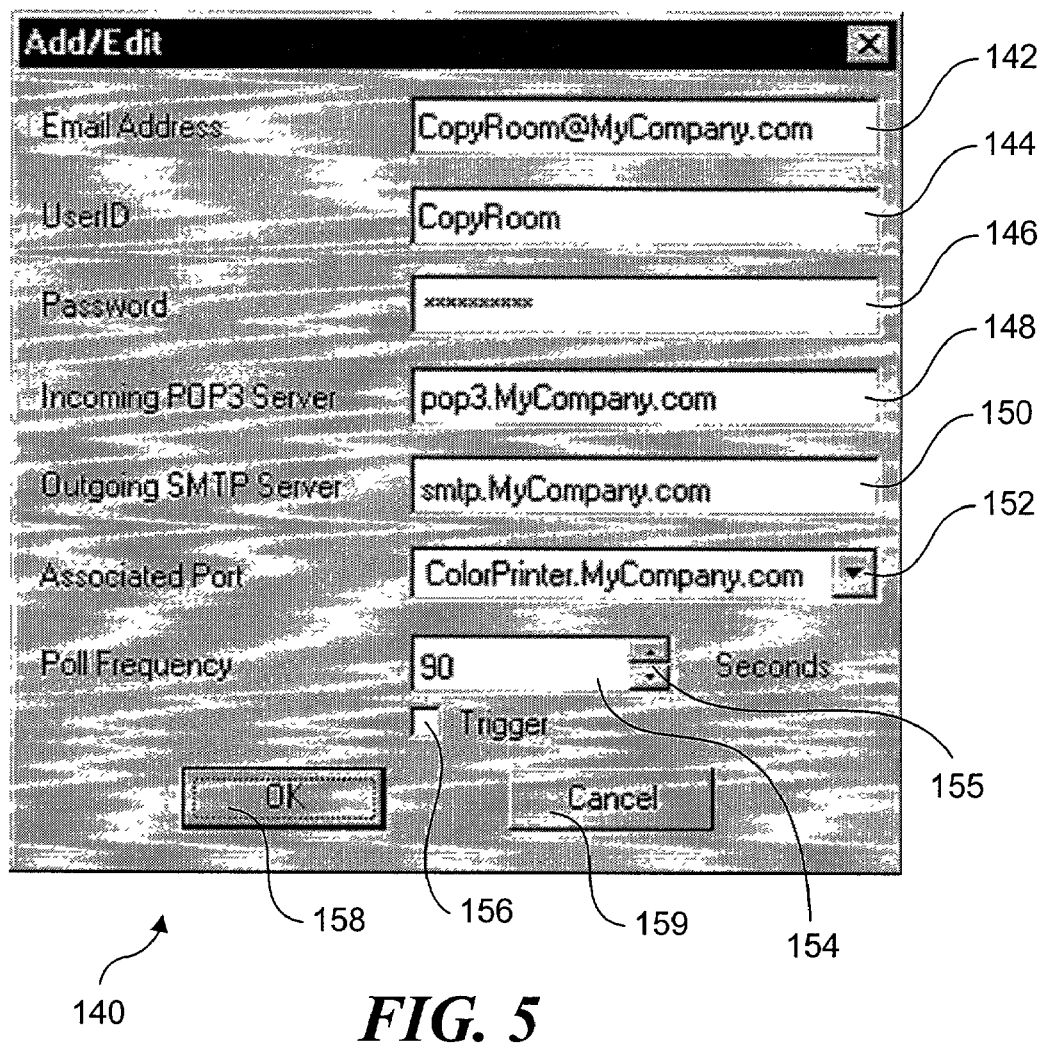
FIG. 5 is a representation of an Add/Edit dialog box that enables an administrator to configure various parameters for a target printer; Web page that is rendered via a browser on an originating device to enable a user to view status information pertaining to a previously submitted print request via the DPS system.

Activation of either "Add" button 134 or "Edit" button 136 will launch and Add/Edit dialog box 140, as shown in FIG. 5. The MPEmail account name is entered in an edit box 142. This account name is used for display in e-mail accounts dialog box 130 and used as a reference when debugging is activated. UserID is entered in an edit box 144. The UserID is the account name used during the POP3 login process when MPEmail retrieves mail from the e-mail account.

The password for the e-mail account is entered in an edit box 146. Typically, e-mail that is stored on a given e-mail server may be access by providing appropriate login credentials, which include the UserID and a corresponding password that is selected by the user (in this case, an MPEmail instance) when the e-mail account is initially set up.

The incoming POP3 server is entered in an edit box 148. This value comprises a DNS (domain name system) name of the e-mail server used during the POP3 login process when MPEmail retrieves mail from the email account. The outgoing SMTP (simple mail transport protocol) server is entered in an edit box 150. This value comprises a DNS name of the email server used when MPEmail sends an e-mail reply for the purpose of providing status back to the consumer user who submits an e-mail print request.

An associate port value may be selected via a dropdown control 152. The associated port comprises the DNS name or IP address assigned to the target printer. The dropdown list will contain the port names for every configured printer for a given Driverless Print Server installation.

A poll frequency value may be entered via an edit box 154 or changed via up and down controls that are adjacent to the edit box. The poll frequency comprises a time in seconds between each attempt to retrieve e-mail via the POP3 protocol. In one embodiment the minimum allowable entry is 30 seconds, while the maximum allowable entry is 3600 seconds.

Selection of a trigger checkbox 156 turns on an e-mail trigger method provided by the MPEmail application that is used for initiating the retrieval of e-mail. The e-mail trigger method is an alternative to the polling method described above and requires additional setup for proper operation. Further details of the e-mail trigger method is described below. When trigger checkbox 156 is marked as selected, edit box 154 and the corresponding up and down controls 155 will be disabled.

Once desired values for Add/Edit dialog box 140 have been entered or selected, the administrator may activate an "OK" button 158 to save the values. Optionally, the administrator may activate a "Cancel" button 154 to cancel an Add or Edit operation.

E-mail print activities may be logged by activating an optional logging feature provided by the MPEmail application. The application will maintain a log file for each account when logging is enabled. To enable logging, the administrator will activate Edit pulldown menu 126 and select the Options menu option. This will launch an Options dialog box (not shown) that includes an Enable logging check box. Logging will be enabled for every account when the Enable logging check box is checked.

The log file will be created in the same directory the MPEmail application is installed. The file name will begin with MPEmail_, and then have the MPEmail account name, with an appended .log. For example, for an account name CopyRoom@MyCompany.com, the log file for that account will be named MPEmail_CopyRoom@MyCompany.com.log. In one embodiment, the log file makes an entry for any failure that might occur and an entry for any successful retrieval of e-mail.

The MPEmail application will send an e-mail response back to the e-mail print service user when the Send reply feature is enabled. This may be enabled by selecting the Send reply check box in the Options dialog box. In one embodiment, checking the Send reply check box will enable the Send reply feature for all accounts.

The e-mail server can implement an event trigger that informs e-mail module 48 when mail has arrived at the e-mail server. When new mail arrives on the e-mail server (e.g., at enterprise e-mail server 50 or ISP e-mail server 51), the e-mail server calls e-mail trigger CGI script 107, which is stored on the Driverless Print Server computer. If the CGI call is successful, the MPEmail application immediately retrieves mail from the e-mail server.

The trigger script call is a TCP/IP connection between any port on the e-mail server and port 80 on the Driverless Print Server computer. The data is sent in the HTTP/1.1 protocol using the POST method as defined in the World Wide Web Consortium (W3C) request for comments (RFC) 2068. The POST is to the locations of the e-mail trigger script (e.g., cgi-bin/trigger.cgi) and the data content comprises named value pairs as described in TABLE 1 below. The e-mail trigger CGI script will verify the POST data and return a text string status in the data section reply. The possible return strings are shown in TABLE 1.

TABLE 1

| Reply String | Description |
| --- | --- |
| success | email module successfully received and processed the data. |
| failure1 | Failed to trigger the email module. Most likely the email module is not running. |
| failure2 | Memory allocation failure in trigger.cgi. The email module was not triggered. |
| failure3 | Zero length content sent to trigger.cgi. The email module was not triggered. |
| failure4 | Failed to get the content length. The email module was not triggered. |
| failure10 | Invalid email address. The email module was not triggered. |

The data transmitted in the HTTP POST will be in name value pair format having the form of AccountName=S. The name value fields are defined in TABLE 2 below:

TABLE 2

| Name | Value | Description |
| --- | --- | --- |
| AccountName | Numeric ASCII String | The email address that is designated for the printer. |

An example of a trigger CGI call for the email address printer1@magicprint.net is:
POST/cgi-bin/trigger.cgi HTTP/1.1[CRLF]Content-Type: text/xml[CRLF]Content-Length: 35[CRLFCRLF]
AccountName=printer1@magicprint.net After retrieving an e-mail, the MPEmail application will split the email into document files for submitting to the Driverless Print Server. The main contents of the e-mail will become a main e-mail content file and each of the file attachments to the e-mail (if any) will become an attachment file. If the main email content is in both text and HTML, the HTML content will be used.

The e-mail header information will be added to the top of the main e-mail content before creating the document file. The main e-mail content file and each attachment file will be submitted as a separate print job to the Driverless Print Server. As an example, if an email with attachments that include an MS Word document and an Adobe Acrobat document are e-mailed to an MPEmail account, three print jobs will be queued on the Driverless Print Server, including a print job for the main e-mail content file, and print jobs for each of the MS Word document and the Adobe Acrobat document.

Figure 6:
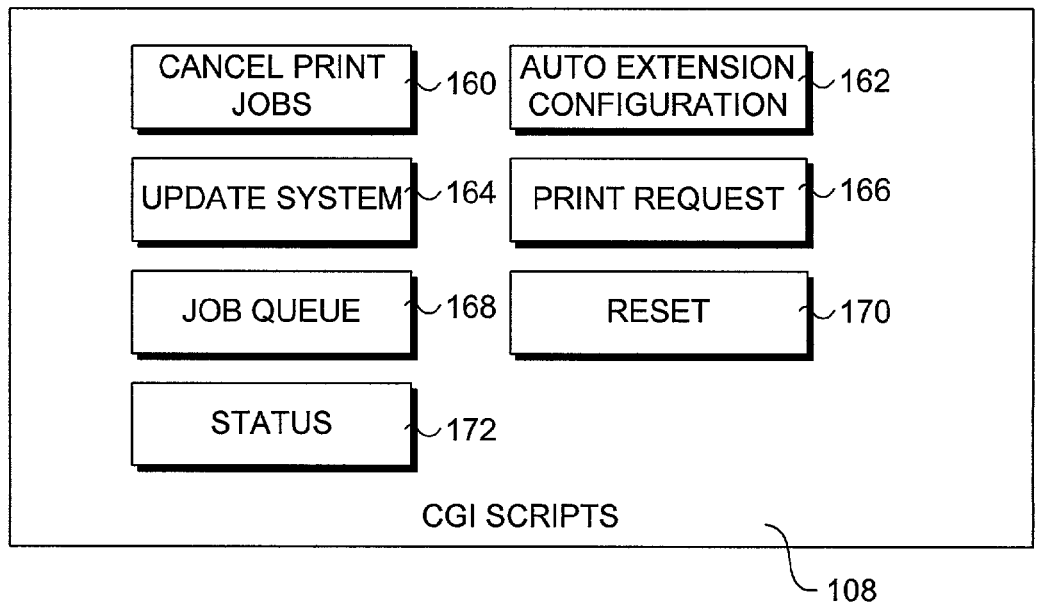
FIG. 6 is a block schematic diagram illustrating various CGI scripts that are used by the DPS system to enable interaction with consumer and administrator users.

Moving on to Document Processing component 101, CGI Scripts 108 provide the Administrative Panel Web pages with advanced functionality. Further details of the CGI scripts are shown in FIG. 6. A cancel print jobs CGI script 160 is used to remove a print job request from a system. From the Administrative Control Panel Web pages, the script can be called for any print job that has been submitted to the system and has yet to have its spool file sent to the printer.

An automatic extension configuration CGI script 162 searches the server computer for installed applications, discovers which document types can be supported by the applications found, and configures the system to allow print job requests of the file types discovered. An update system CGI script 164 is used to compare the installed system components against the latest available components, downloads any new components (when applicable), and installs them on the system.

A Print Request CGI script 166 takes files provided by the MPEmail application and creates a corresponding print job request to the system. A Job Queue CGI script 168 reads the queue of print job requests from the system and returns the list to the script's calling Web page.

A Reset CGI script 170 closes the system applications and starts them again. This script is used as a last resort attempt by the system administrator to clear any program errors that may have occurred. A Status CGI script 172 provides the Administrative Control Panel Web pages with the progress status of a print job request.

Figure 7:
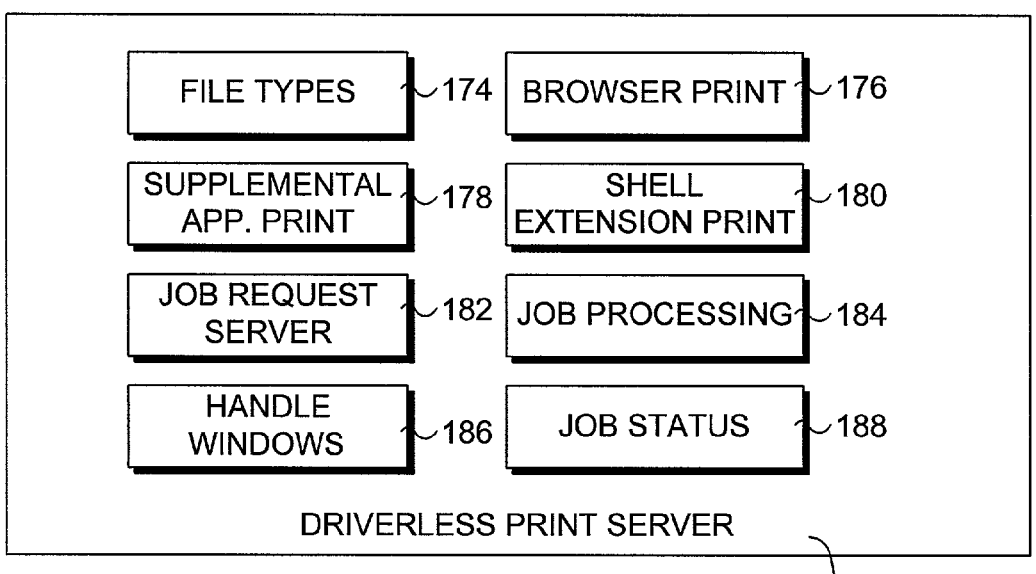
FIG. 7 is a block schematic diagram illustrating various software components corresponding to the driverless print server software in accordance with one embodiment of the invention.

The components implemented by Driverless Print Server 46 are shown in FIG. 7. The Driverless Print Server is the main software component for the system. It comprises an application that runs on the DPS server computer that accepts job requests, queues the requests and directs the print process for the document, image or URL from request to final printing. The Driverless Print Server includes a File Types Configuration list 174, a Browser Print component 176, a Supplemental Application Print component 178, a Shell Extension Print component 180, a Job Request Server component 182, a Job Processing component 184, a Handle Windows component 186, and a Job Status component 188.

File Types Configuration list 174 is maintained by the Driverless Print Server. The configuration list has, for each file type, the extension, and the method used to print that file type. When the printing method is provided by Supplemental Application Print component 178, the list contains the path to the application used for printing, the menu commands the application uses to print, and the menu commands the application uses to close the application.

The Browser Print component 176 comprises one of three methods the Driverless Print Server uses to print. In one embodiment, this component uses the application programming interface (API) provided by the Microsoft Internet Explorer (IE) Web browser. Using the IE API, the component runs the browser within a window on the Driverless Print Server application. Typically, the Browser Print component will be used to print images and PDF (portable document format) documents.

Document and image files can be printed using this method if the IE browser instance on the DPS server computer is configured with a browser plug-in for the type of document or image file requested. For example, consider the IE plug-in for Adobe Acrobat™. Adobe Acrobat document files have a PDF extension. If the Acrobat plug-in is installed on the server, IE's navigate programming interface allows PDF files to be loaded in IE and IE's print programming interface will allow printing of the file.

The Supplemental Application Print component 178 provides another method used by the Driverless Print Server to print. This component uses File Types Configuration list 174 to find the application associated with the file extension, load the file into the application, execute the print menu command for the application, and close the application upon completion of the printing operation. With the combination of the File Types Configuration list and the Supplemental application Print method, the system administrator can add support for additional document or image types by installing the application on the server machine and editing the File Types Configuration list.

The Shell Extension Print component 180 provides a third method used by the Driverless Print Server to print. This component uses the MS Windows Shell Extensions programming interface to print. The MS Windows Shell Extensions interface is an operating system feature that allows a user to print a document type with a command sent to the application that supports the document type. If the application supports the Shell Extension interface, the application will load the document, print it, and close itself. With the combination of the File Types configuration list and the Shell Extension Print method, the system administrator can add support for additional documents or image types by installing the application on the server machine and editing File Types configuration list 174.

The Job Request Server component 182 takes print job requests from Print Request CGI script 166 and queues them for processing.

The Job Processing component 184 manages print job request from insertion into the job queue until the spool file is sent to the printer. This component reads the queued job requests, determines which one of the three printing methods will be used for printing, submits the document, image, or URL to the determined printing method, handles executing the print command, and submits the spool file to the status monitor for printing. During the stages of the printing process, the status is tracked and made available to any Status CGI script 172 calls that may be made.

The Handle Windows component 186 is used to provide reliable printing. Many applications display message boxes and/or dialogs during the printing process to inform or gather information from the user who is requesting printing services. In order to support automatic processing of print requests, there needs to be a mechanism to respond to any message box or dialog that might appear in the application used to print the request. This mechanism is provided by Handle Windows component 186. The Driverless Print Server watches the server during the printing process for messages boxes and dialogs that might appear. When a new message box or dialog appears, the Handle Windows component reads the information, compares it with known messages or known statements, and closes the message box or dialog according to its programmed logic. Further details of the Handle Windows component are discussed below with reference to FIG. 18.

The Job Status component 188 is provided to maintain a memory-mapped file of all of the jobs in each Driverless Print Server queue. At periodic intervals, job status information is written to the memory-mapped file so that the Status CGI script can read the status of job requests.

A Port Monitor comprises a standard component in the MS Windows printing subsystem. The port monitor receives spooled data form the printer driver via the printing subsystem. A traditional port monitor is responsible for taking the spooled data from the printer driver and delivering it to the printer. In the Driverless Print Server system, Port Monitor module 110 (FIG. 2) writes the spooled data to a file. Once the entire spool file has been written to a file, Port Monitor module 110 messages the Driverless Print Server with the name and location of the spooled file.

Status Monitor 112 comprises an application that runs on the DPS server computer. It performs a plurality of functions, but it is primarily responsible for sending spool files to printers. After the Driverless Print Server is messaged form Port Monitor 110 with the location of a spool file, the Driverless Print Server messages Status Monitor 112 with the location of the spool file, the URL of the printer where the spool file should be send, and protocol information for sending the spool file to the printer. Status Monitor 112 creates a queue for each requested printer URL. Since the printer can only receive one spool file at a time, it serializes the spool file transmittals. Status Monitor 112 can create and maintain multiple queues simultaneously.

After the spool file has been successfully sent to the printer, Status Monitor 112 messages the Driverless Print Server that the job is complete. The job history is updated, and the job is removed from the Driverless Print Server queue. Status Monitor 112 can be configured to send a message to external systems before or after the spool file has been sent to the printer. An example of an external system might be a hotel billing system, which could use the information to apply a charge to a guest's bill.

Proceeding to Administration component 102, System Monitor 114 comprises an application that monitors all the other system components, watching for failures and listening for specific requests. When print job requests arrive from Print Request CGI script 166, if the Driverless Print Server application is not running, the Print Request CGI script can request that System Monitor 114 start the Driverless Print Server, thus allowing the print job request. System Monitor 114 periodically sends messages to the Driverless Print Server to get the status of the program and any print jobs in its queue. If the System Monitor detects a failure, it will clear the problem.

System Monitor 114 may also be used to download and install newer system components. It collects the version numbers of all components in the system and sends them to a system's Update Web site. If the Update Web site replies with information about the availability of newer components, it will retrieve those components and install them on the system. The System Monitor accepts update requests from its menus or from Update System CGI script 164.

Figure 8:
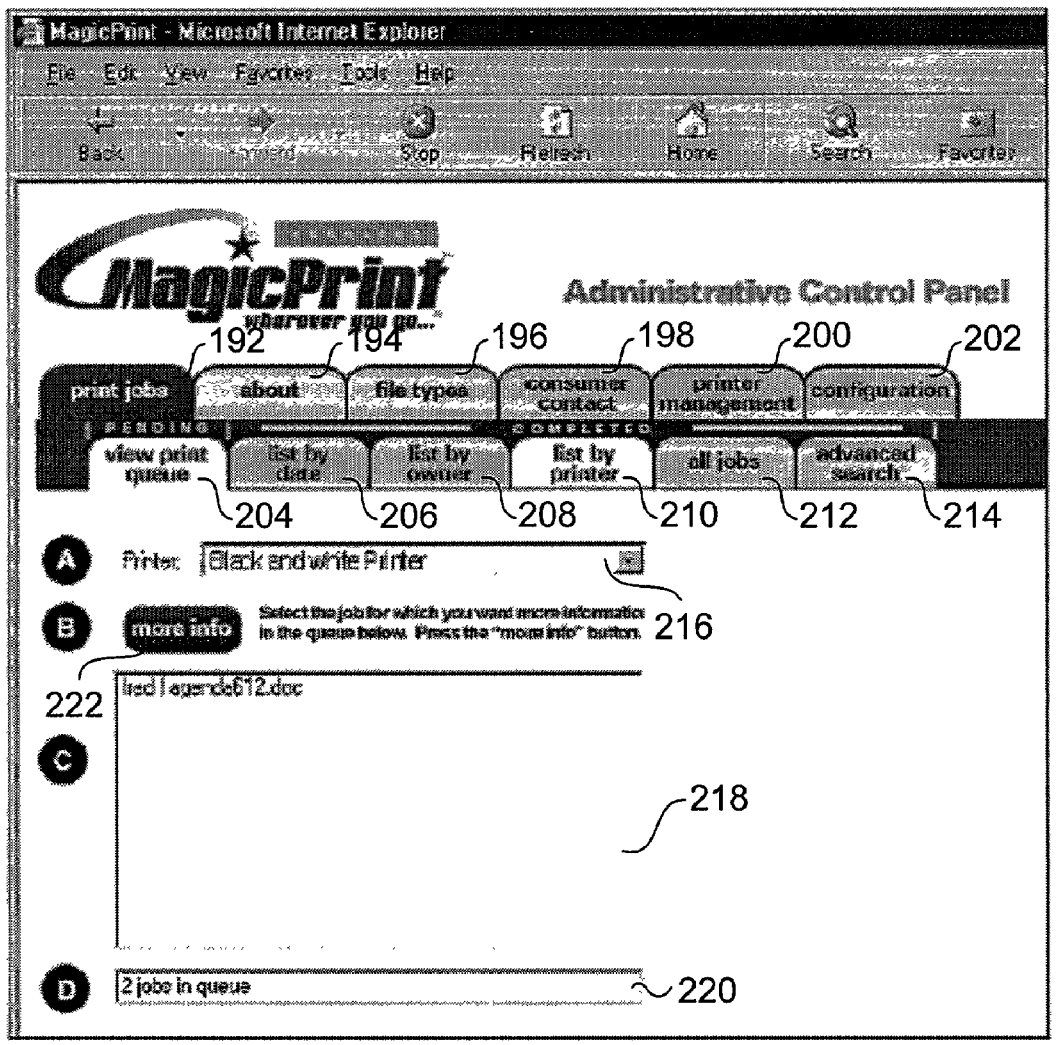
FIG. 8 is a representation of a Web page that is rendered via a browser on a DPS server or via a client device used by an administrator user to enable the administrator to view print queue information for a given DPS site.

Administrative (Panel) Web pages 124 allow remote configuration and monitoring of a system by administrative users. A security feature is used to prevent access of these Web pages by consumer users. An exemplary Administrative Panel Web page 190 is shown in FIG. 8. Administrative Panel Web page 190 provides a plurality of top level tabs for navigating to Administrative Web pages corresponding to the tabs, including a print jobs tab 192, an about tab 194, a file types tab 196, a consumer contact tab 198, a printer management tab 200, and a configuration tab 202.

Activation of print jobs tab 192 causes a lower set of tabs to be rendered, as shown in FIG. 8. These include a view print queue tab 204, a list by date tab 206, a list by owner tab 208, a list by printer tab 210, an all jobs tab 212, and an advanced search tab 214. As shown in FIG. 8, activation of view print queue tab 204 enables an administrator to view pending print jobs for a printer that is selected via a pulldown control 216. The pending print jobs are displayed in a text box 218, and the number of jobs in the queue are displayed in a text box 220. Activation of a more info button 222 enables the administrator to see more information for a selected print job.

Figure 9:
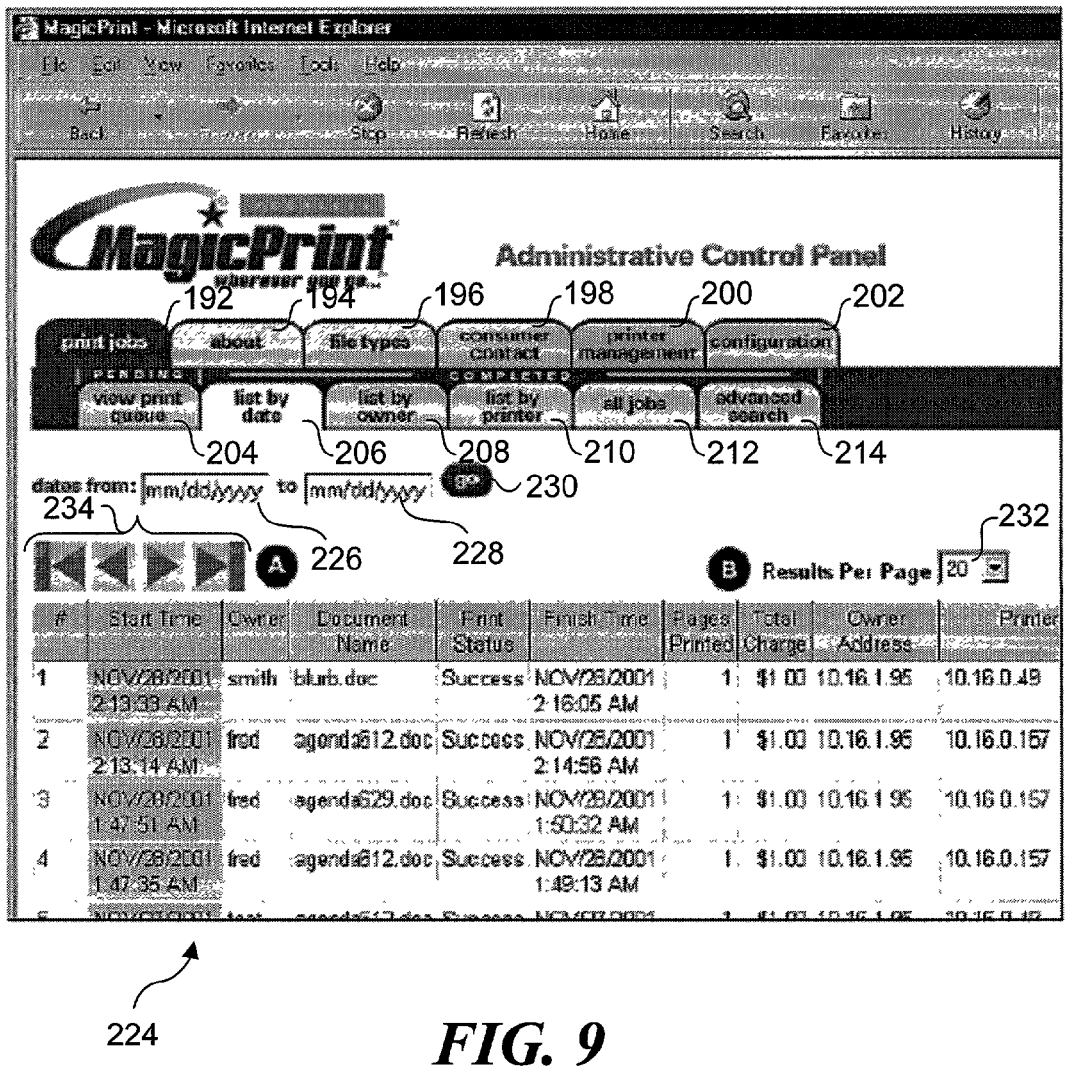
FIG. 9 is a representation of a Web page that is rendered via a browser on a DPS server or via a client device used by an administrator user to enable the administrator to view completed print jobs for a selected date range for a given DPS site.

Activation of list by date tab 206, list by owner tab 208, list by printer tab 210 and all jobs tab 212 enable the administrator to view a history of print jobs pertaining to the particular tab selected. For example, activation of list by date tab 206 allows an administrator to view all print jobs for a given Driverless Print Server for a selected date range, as depicted by an Administrative Panel Web page 224 shown in FIG. 9. The administrator then enters start date and end date values via edit boxes 226 and 228 and activates a "go" button 230 to request the records for all the print jobs within the date range be retrieved. The number of results per page may be selected via a pulldown control 232, and navigation between records is enabled by a set of navigation controls 234. Each record includes information pertaining to a start time, owner, document name, print status, a finish time, number of pages printed, total charges, owner address, and printer address.

Figure 10:
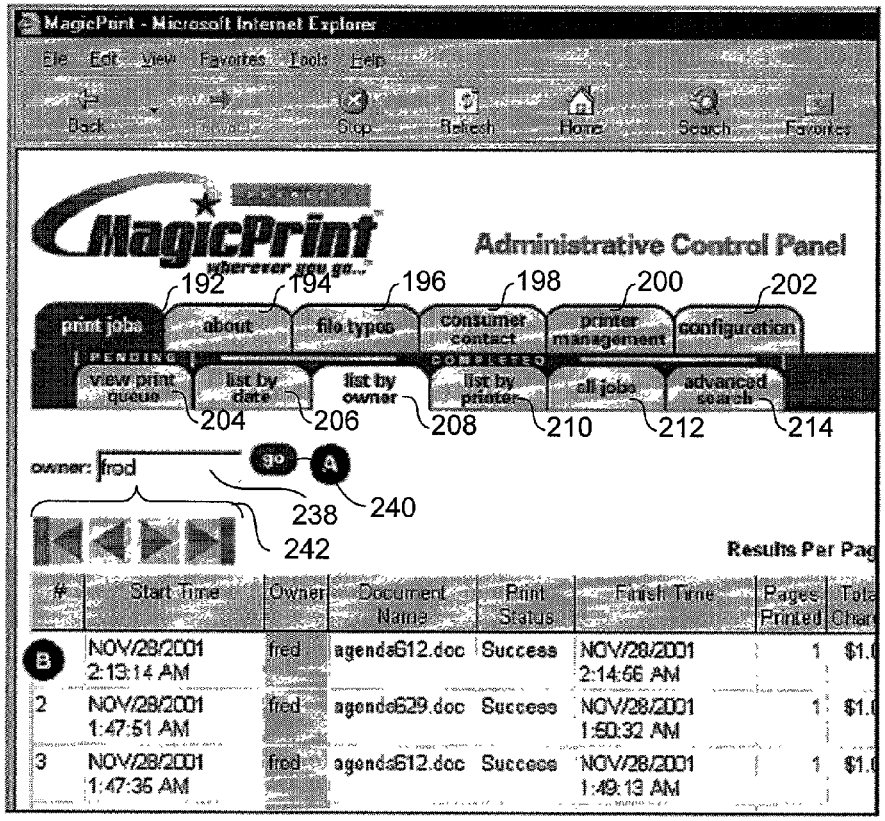
FIG. 10 is a representation of a Web page that is rendered via a browser on a DPS server or via a client device used by an administrator user to enable the administrator to view completed print jobs for a selected owner for a given DPS site.

Activation of list by owner tab 208 enables the administrator to view information on all jobs submitted to a particular owner, a depicted by an Administrative Panel Web page 236 in FIG. 10. Typically, the owner may be the return e-mail address corresponding to the personal e-mail account the consumer user used to send the e-mail print request. If desired, a table mapping e-mail addresses to actual people or business entities may be implemented so that access to owner information may be accomplished by simply entering the name or the person or business entity rather than the e-mail address. The owner information is entered in an edit box 238. The administrator then activates a "go" button 240 to retrieve records corresponding to the owner. As before, the number of results per page can be select via a corresponding control (not shown), and navigation between records is enabled via a navigation control set 242.

Figure 11:
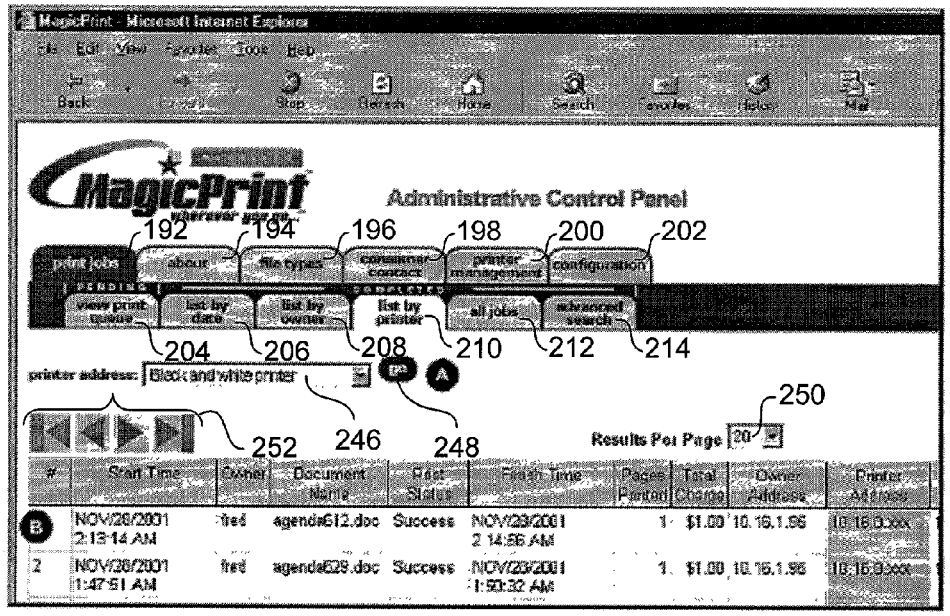
FIG. 11 is a representation of a Web page that is rendered via a browser on a DPS server or via a client device used by an administrator user to enable the administrator to view completed print jobs for a selected printer for a given DPS site.

Activation of list by printer tab 210 enables the administrator to view all of the completed jobs for a selected printer, as depicted by an Administrative Panel Web page 244 in FIG. 11. The identity of the printer for which the print job history is desired is selected via a pulldown control 246, whereupon corresponding records will be retrieved in response to activation of a "go" button 248. The number of results per page may be selected via a pulldown control 250, and navigation between records is provided by a navigation control set 252.

Figure 12:
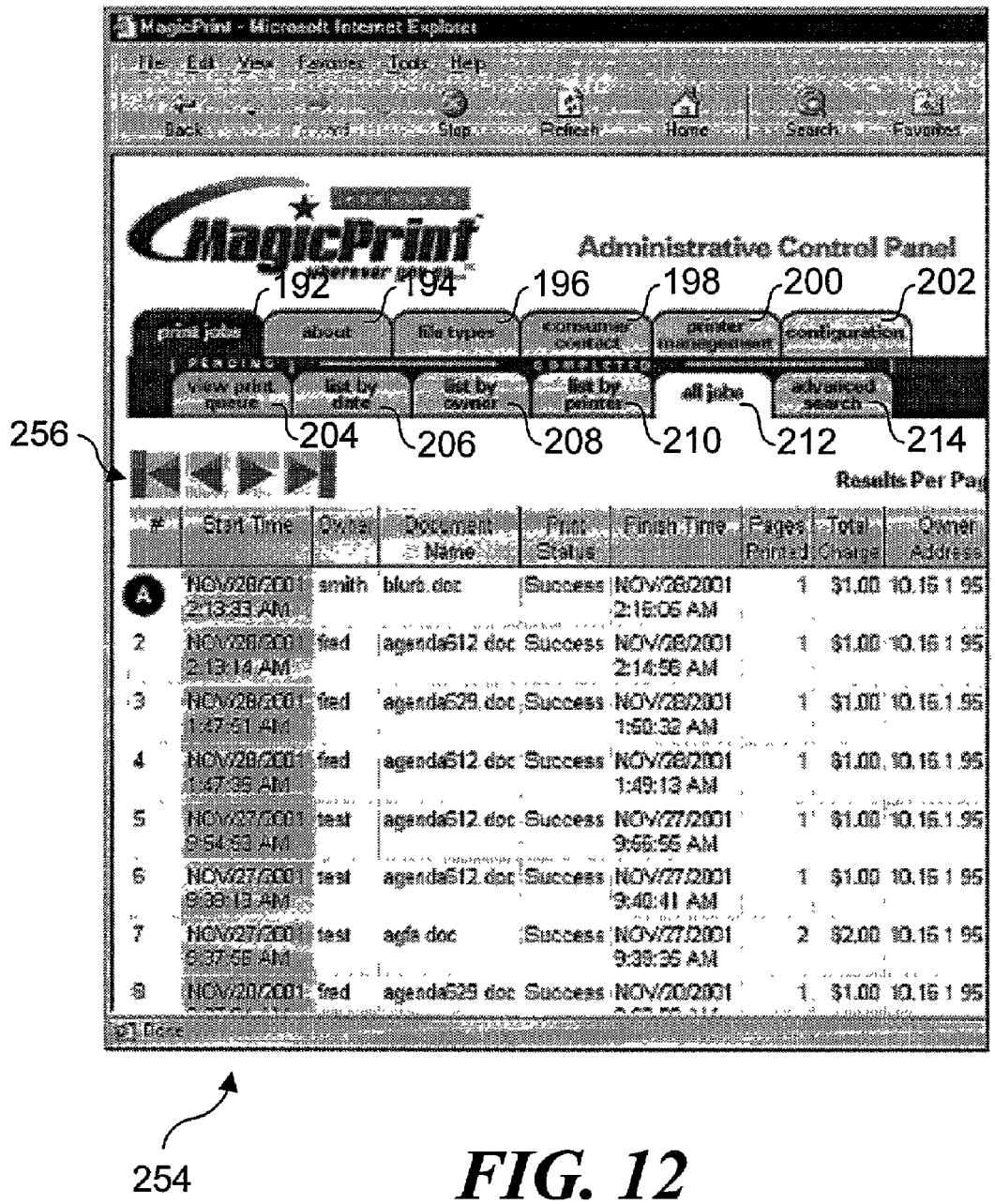
FIG. 12 is a representation of a Web page that is rendered via a browser on a DPS server or via a client device used by an administrator user to enable the administrator to view all completed print jobs for a given DPS site.

Activation of all jobs tab 212 enables the administrator to view information pertaining to all jobs printed through a particular Driverless Printer Server, as depicted by an Administrative Panel Web page 254 in FIG. 12. As before, the number of results per page may be selected via a corresponding control (not shown), and navigation between records is enabled via a set of navigation controls 294.

Figure 13:
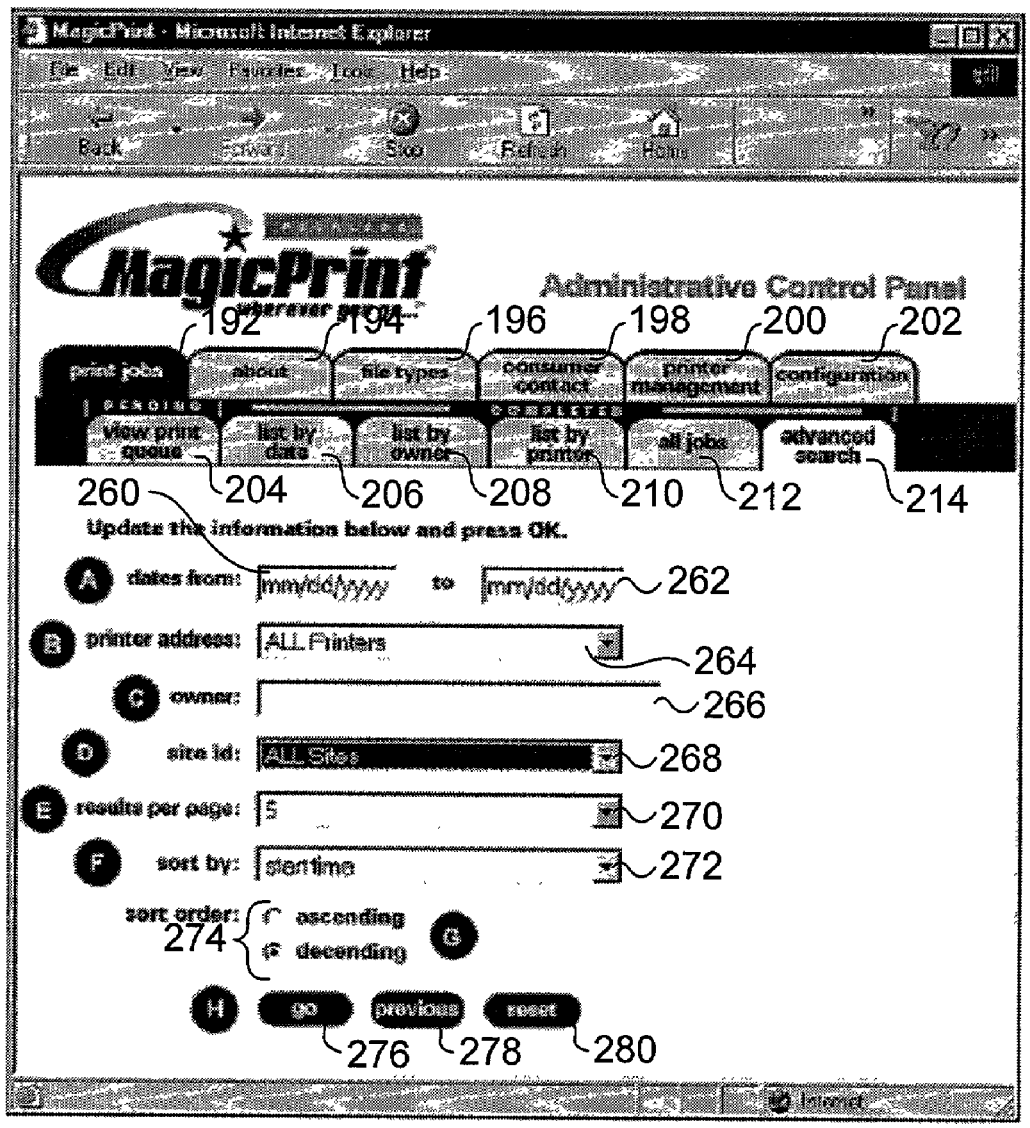
FIG. 13 is a representation of a Web page that is rendered via a browser on a DPS server or via a client device used by an administrator user to enable the administrator to view various completed print jobs information based on selectable search information input by the administrator.

Activation of advanced search tab 252 enables the administrator to view information pertaining to print jobs that are selected based on various input values, as depicted by an Administrative Panel Web page 258 in FIG. 13. A date range for the search is entered via start and end date edit boxes 260 and 262. The printer or printer(s) may be selected via a pulldown control 264. The owner for the printer may be provided in a block 266. If no owner is specific, the search will be performed for all owners. A site identification may be selected via a pulldown control 268. The results per page may be selected via a pulldown control 270. A pulldown control 272 is provided to enable the administrator to define a column to sort by. A pair of radio buttons 274 enable the sort order to be defined as either ascending or descending. Once desired values have been entered and selected, the administrator may initiate the search via a "go" button 276. A previous set of search parameters may be retrieved via activation of a "previous" button 278, while the values for the various search parameters may be reset to default values via activation of a "reset" button 280.

Figure 14:
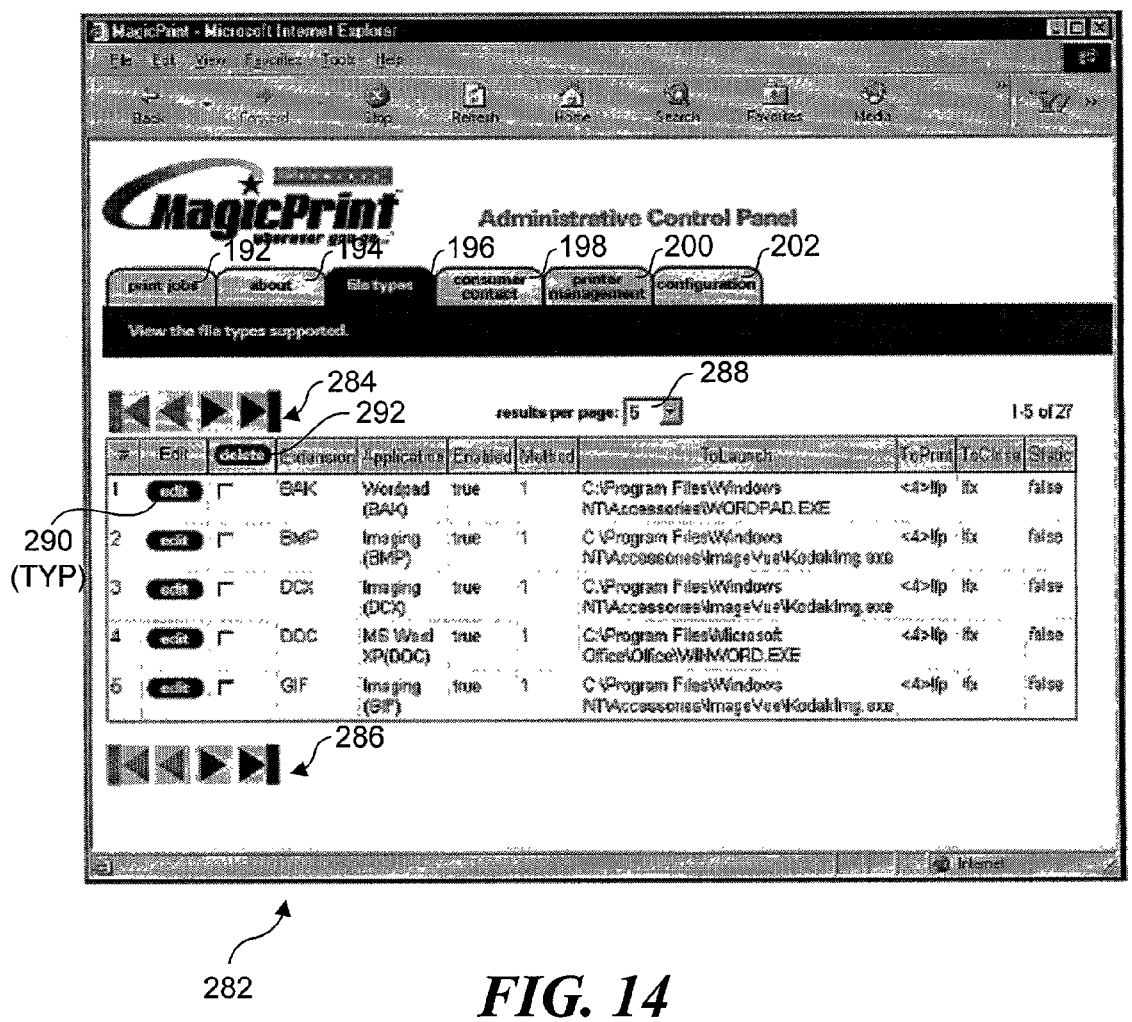
FIG. 14 is a representation of a Web page that is rendered via a browser on a DPS server or via a client device used by an administrator user to enable the administrator to view and edit file type information pertaining to document file types supported by a given DPS site.

Activation of file types tab 234 enables the administrator to view and/or edit the file types for documents and image files that may be printed by the Driverless Print Server, as depicted by a Web page 282 in FIG. 14. Navigation of the various file type records is provided via an edit control set 284 and an edit control set 286. The number of records per page may be selected via a pull-down control 288. If it is desired to edit values for a particular file type, the administrator may activate an "edit" button 290 in the appropriate row, which will enable the values in the value columns to be edited. These columns include an "Extension" column, an "Application" column, and "Enabled" column, a "Method" column, a "ToLaunch" column, a "ToPrint" column, a "ToClose" column, and a "Static" column. The extension for the file type is entered in the "Extension" column. The name of the corresponding application or type of application (e.g., imaging) is entered in the "Application" column. The file path to launch the application is entered in the "ToLaunch" column. Internal commands for printing from and closing an application may be entered in the "ToPrint" column and the "ToClose" column, respectively. File type mapping information corresponding to a given row can be deleted by marking appropriate check boxes in a delete column and activating a delete button 292.

Figure 15:
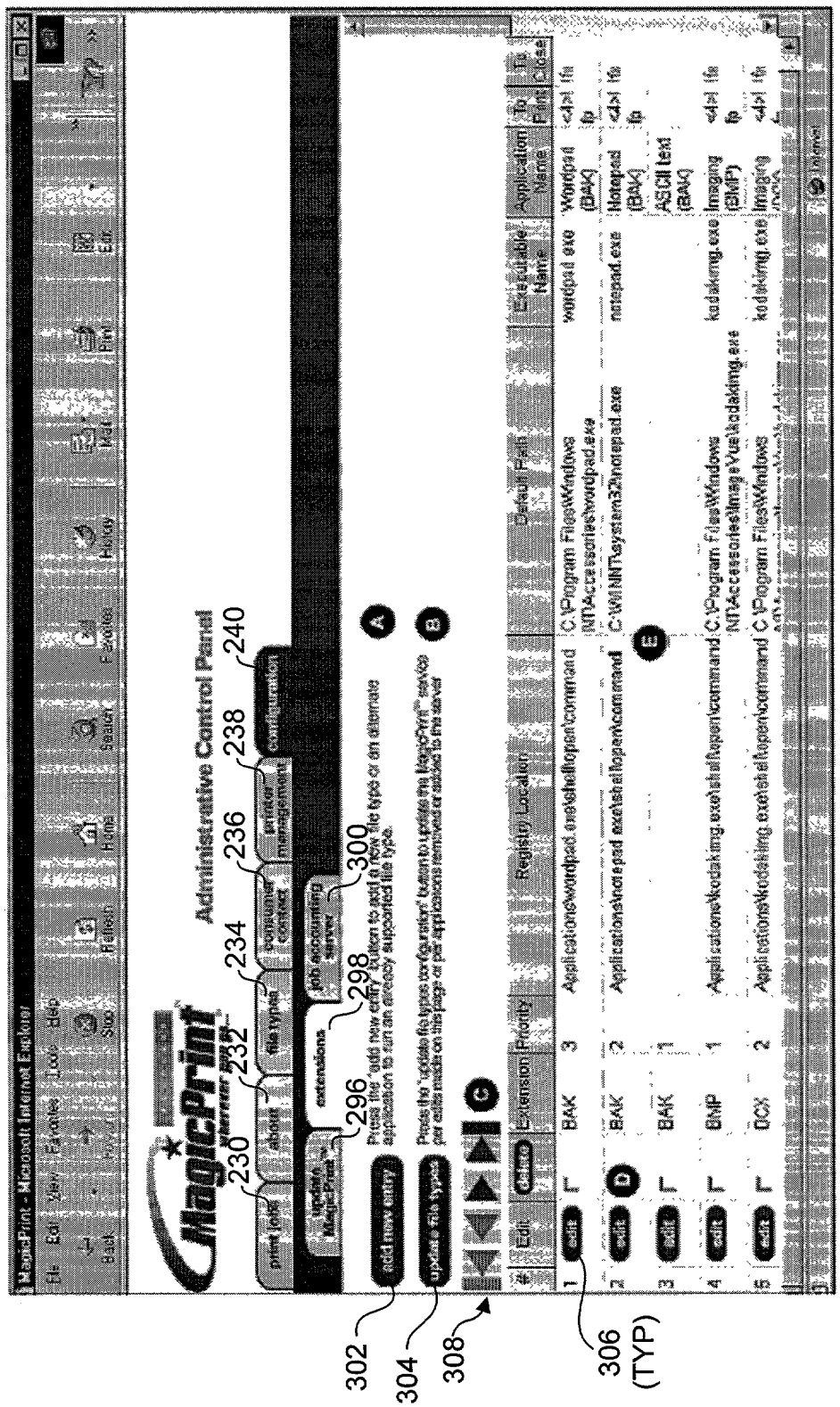
FIG. 15 is a representation of a Web page that is rendered via a browser on a DPS server or via a client device used by an administrator user to enable the administrator to view and file extension and corresponding application information pertaining to document file types supported by a given DPS site.

Activation of configuration tab 202 enable the administrator to update and configure the operation of a Driverless Print Server installation. As shown in FIG. 15, activation of the configuration tab loads a Web page 294 that provides three additional tabs, including an update tab 296, an extensions tab 298, and a job accounting server tab 300. Activation of extensions tab 298 launches an Extensions Web page corresponding to Web page 294.

When a file is submitted for printing, the Driverless Print Server opens an application corresponding to the file's file type. For example, if the file has a .doc extension an MS Word application will generally be opened. The application then opens the file, and through its built-in print commands, sends the submitted file to a selected printer. The extensions Web page (i.e., Web page 294) displays rows (entries) that list file type information (in an "Extension" column) and the software application corresponding to the file type (in an "Application Name" column). Each of the entries also displays a priority level for the extension (to define an order in which file types with the same extension are evaluated to determine the appropriate application for the submitted file), a Registry Location that identifies where in the OS registry information pertaining to the application is stored, a Default Path for the application, an Executable Name for the application, and internal codes to print and close the application. An administrator can add a new file type via activation of an "add new entry" button 302, which will render a Web page with corresponding edit controls for each of the columns in Web page 294 (not shown). A similar Web page is rendered in response to activation of an "update file types" button 304, only in this instance the edit controls will be filled in with values pertaining to a selected file type to be updated. Updating of a file type can also be initiated by activation of an "edit" button 306. As before, navigating between records is enabled by a set of navigation controls 308.

The Driverless Print Server uses an Extensions Table corresponding to the file type values to determine which applications installed on the server computer to use for printing files of each file type listed in the Extensions Table. The information in the table is also used to determine the location of the executable files on the server computer. In one embodiment, the Extensions Table and various other configuration and print job data is maintained in a database. Typically, the database will be hosted on the same machine as hosts the DPS software, although a separate machine may also be used to host the database, as will be recognized by those skilled in the art.

Processing a Print Request

Figure 16:
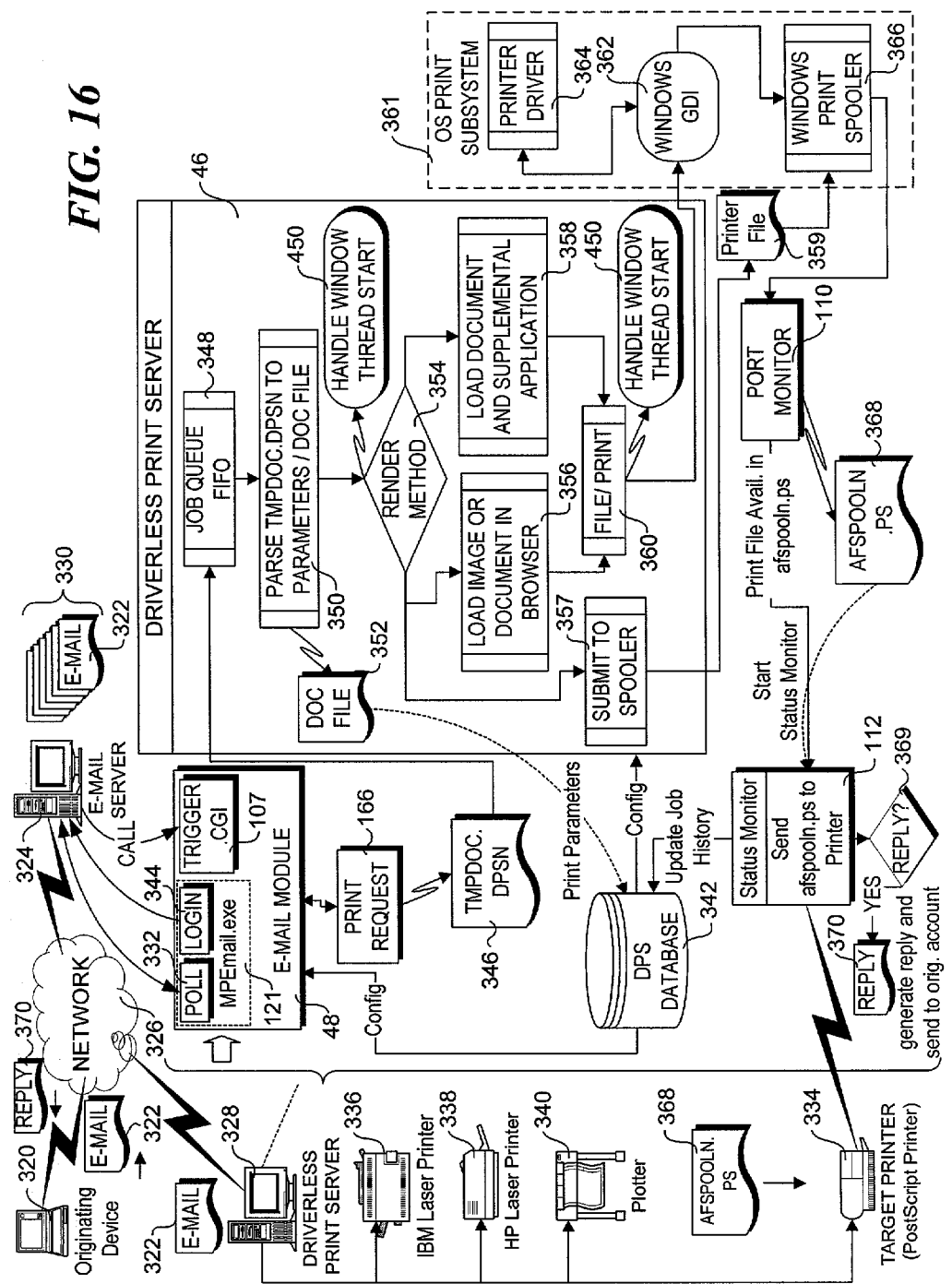
FIG. 16 is a schematic diagram illustrating a typical data flow process corresponding to a print request submitted to a driverless print server via an e-mail.

A data flow diagram that illustrates data flows and operations performed by the e-mail module and DPS system software components in response to an e-mail print request is shown in FIG. 16. Initially, the user of an originating device 320 will send an e-mail message 322 to a virtual printer e-mail address corresponding to an e-mail address account that is hosted by an e-mail server 324. Generally, the e-mail message will be sent from the originating device to the e-mail server via a computer network 326, such as a LAN, WAN or the Internet. As discussed above, the e-mail server may be provided by an ISP, may be an enterprise e-mail server, or may be provided by e-mail server software running on a Driverless Print Server computer 328. Both ISP and enterprise e-mail servers generally support multiple e-mail accounts, with the e-mail server storing zero or more messages for each account. These messages are depicted as e-mail messages 330, and will include e-mail message 322.

As discussed above, all of the software components shown in FIG. 2 are running on Driverless Print Server, including e-mail module 48 and document processing component 101, the former of which includes MPEmail application the latter of which includes Driverless Print Server software 46. Based on the e-mail notification method selected via Add/Edit dialog box 140, e-mail module 48 will either employ a polling method 332 to poll e-mail server 324 to see if any messages have been received corresponding to the virtual printer address of a target printer 334 in the manner discussed above. Optionally, if trigger checkbox 156 is checked, e-mail server 324 will call e-mail trigger CGI script 106 that is stored on Driverless Print Server computer 328 via an appropriate call mechanism when e-mail is received that has been addressed to the virtual printer e-mail address. The e-mail trigger CGI script will then be run in the manner described above.

Generally, a Driverless Print Server installation or "site" will provide support for one or more printers. As shown in FIG. 16, the DPS site corresponding to the present example include a PostScript printer 336, an HP Laser printer 338, a plotter 340, as well as target printer 334. A separate set of configuration parameters will be set up for each printer, and stored in a DPS database 342. In accordance with a site that has multiple printers available, either polling method 332 and/or the e-mail trigger CGI script calling mechanism may need to be configured to support the multiple printers. For example, in one embodiment polling method 332 may check for e-mail corresponding to the virtual printer e-mail address for each of the printers at the DPS site. In another embodiment, the polling method may be called separately for each printer. Similarly, the e-mail trigger call mechanism may be set up on the e-mail server such that e-mail trigger CGI script 107 is called anytime mail is received in an e-mail account corresponding to any of the printers at the DPS site.

Once it is determined that e-mail has been received corresponding to one of the virtual printer e-mail addresses, the e-mail is retrieved from the e-mail server. Typically, this will comprises logging into the e-mail server using an appropriate login method (e.g., providing a POP3 host address, UserID and password for a POP3 e-mail server). This logic method is depicted as login method 344 in FIG. 16.

Upon receiving the e-mail, each e-mail message will be handled individually by MPEmail application 121. As discussed above, the content of the e-mail will be divided into separate main e-mail and attachment files, and Print Request CGI script 166 will be called to generate a print job request 346. In one embodiment, the print job request comprises a document named Tmpdoc.dpsn (n representing a number) that is sent via the Print Request CGI script to a job queue 348. In one embodiment, the job queue comprises a first-in first-out (FIFO) type of job queue. Optionally, other types of job queues may also be used, as will be recognized by those skilled in the art. As discussed above, job queue operations are performed by job processing component 184.

The job queue submits job requests to be processed by the system. Each request is processed by a block 350 in which the tmpdoc.dpsn file is parsed to retrieve print job parameters corresponding to the print request, which are stored in a document file 352. For example, parsed information may include a printer selection, number of copies, identity of consumer user, document name, etc. A portion of the print job parameters are then stored in DPS database 342.

In a decision block 354, a determination is made to what type of file corresponds to a current print job, e.g., a text file, an application file, an image file or a printer file. If the document pertains to a browsable document, image, PDF file, or other type of object that can be rendered on a browser, the logic flows to a block 356, wherein the image or PDF document is loaded via the Driverless Print Server's browser. Otherwise, the logic flows to a block 358 in which the document and an appropriate supplemental application that can be used to print the document is loaded. For example, if the document comprises a MS Excel spreadsheet, an instance of the MS Excel application is loaded, along with the Excel document.

In a block 360, an internal command is generated to invoke a print operation that will cause the browser or supplemental application to print the source data. For example, most applications provide a File->Print menu option that initiates a printing process for the application. In this instance, the DPS software will generate an event corresponding to a print command, which will be handled by the application as if a user selected the File->Print menu option. Optionally, as discussed above, the DPS software may employ Shell Extension Print component 180 to make an appropriate operating system API call to invoke a printing operation to cause the source data to be printed.

In response to an internal application or browser print request, various printing and document information is passed internally to operating system components that handle printer operations. As discussed above, in one embodiment the Driverless Print Server is operated in an MS Windows OS environment. Accordingly, this environment provides an OS print subsystem 361 including a Graphical Device Interface (GDI) component 362 that interacts with a printer device driver 364 corresponding to the target printer to generate appropriate printer (i.e., output device) data that will be sent to the target printer to produce an output document. The printer data is internally handled by an MS Windows print spooler component 366 that outputs a print spool file containing the printer data that is received by Port Monitor 110.

In the illustrated example, it is assumed that target printer 334 comprises a PostScript printer. Accordingly, Windows Print Spooler sends printer data comprising a PostScript file 368 to Port Monitor 110, which then starts Status Monitor 112 and submits the PostScript file to the Status monitor. Status Monitor 112 then submits PostScript file 368 to target printer 334. In conjunction with this event, job history information is updated in a DPS database 342.

In one embodiment, the Driverless Print Server supports direct printing of printer files. For instance, if the print job file comprises a printer file, it can be directly printed if it corresponds to a printer file type of the target printer. For example, PostScript files may be printed on PostScript printers. Similarly, printer files for other types of printers may have been previously created by selecting a "save to file" option during a print process. If the file is determined to be a printer file in decision block 354, the logic proceeds to a block 357, wherein the printer file (depicted by a printer file 359) is directly sent to Windows print spooler 366.

As discussed above, the system may be configured to automatically send a reply message back to the e-mail account from which the original e-mail print request was sent. Accordingly, a determination is made in a decision block 369 to whether the reply option is selected, and if it is, an e-mail reply message 370 containing the status for the print request is generated and sent to the e-mail account address of the user who submitted e-mail message 322. In one embodiment, MPEmail application 121 calls Status CGI script 172 to retrieve the status of the print job corresponding to the print request, appends the status to the e-mail reply message, parses the header of the original e-mail print request message (e.g., e-mail message 322) to extract the sender's e-mail address, and sends the e-mail reply message to that address.

Figure 17:
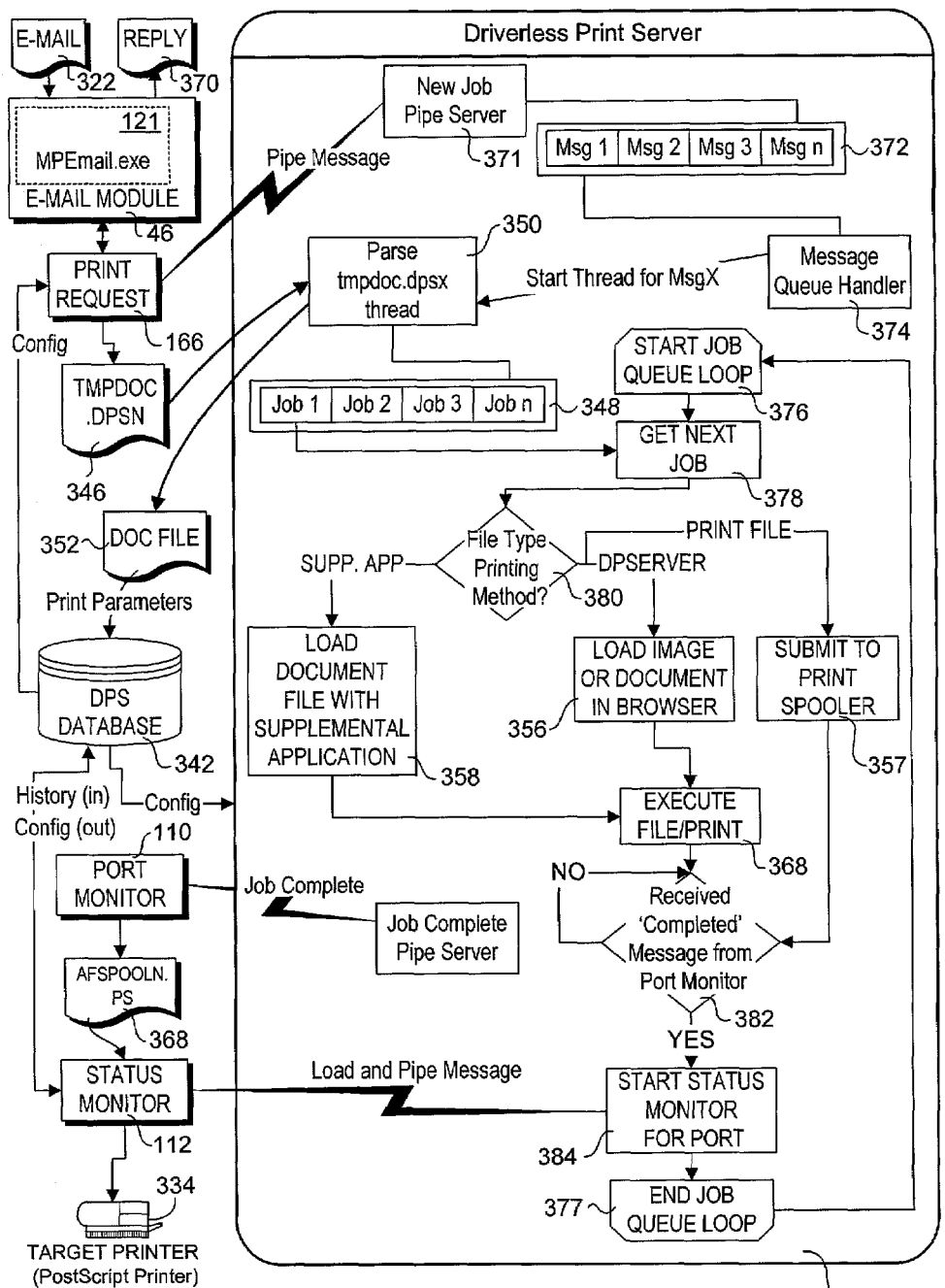
FIG. 17 is a combination schematic diagram and flow chart illustrating further operations and logic provided by the driverless print server software.

Further details of the internal operations of Driverless Print Server software 46 are shown in FIG. 17. As before, e-mail 322 is retrieved and processed by e-mail module 48, which calls Print Request CGI script 166 for each main e-mail or attachment file. In response, Print Request CGI script 166 creates a print job document (i.e., tmpdoc.dpsn document 346) for each file. The Print Request CGI script also pipes a message containing a print request to a New Job Pipe Server 371, which stores the messages in a message queue 372. For each print request message, a Message Queue Handler 374 starts a corresponding thread that parses the corresponding print job document, thereby generating document file 352 and submitting a print job to job queue 348.

As depicted by a start job queue loop block 376 and end job queue loop block 377, the following operations and logic displayed between these loop ends is performed for each print job. First, in a block 378, the next job is retrieved from job queue 348. In a decision block 380 in which a determination is made to what type of file type printing method should be used. If the file requires a supplemental application (e.g., MS Word, MS Excel, AutoCad, etc.), the logic proceeds to block 366 where the document and appropriate supplemental application is loaded in the manner discussed above. Once the file is loaded in the supplemental application, a file printing command is internally generated in block 360 to submit the file for printing by the OS, as before.

Next, in a decision block 382 a determination is made to whether a "Completed" message is received from Port Monitor 110. This determination is made on a periodic basis or through a software interrupt mechanism until the "Completed" message has been received. Status Monitor 112 is then started in a block 384, which sends print document 368 to target printer 334 and updates the job history data in DPS database 342, as before.

Returning to decision block 380, if the document type is a file type that can be printed directly by the Driverless Print Server computer without requiring a supplemental application (e.g., a PDF document or various types of image files), the logic proceeds to block 356, wherein the DPS computer's browser loads the image or document to render an corresponding image or document. Once rendered, the remaining print operations are performed in the manner discussed above, beginning with block 360. As discussed above, if the document type is a printer file, the document is directly sent to Windows Print Spooler 366.

Figure 18:
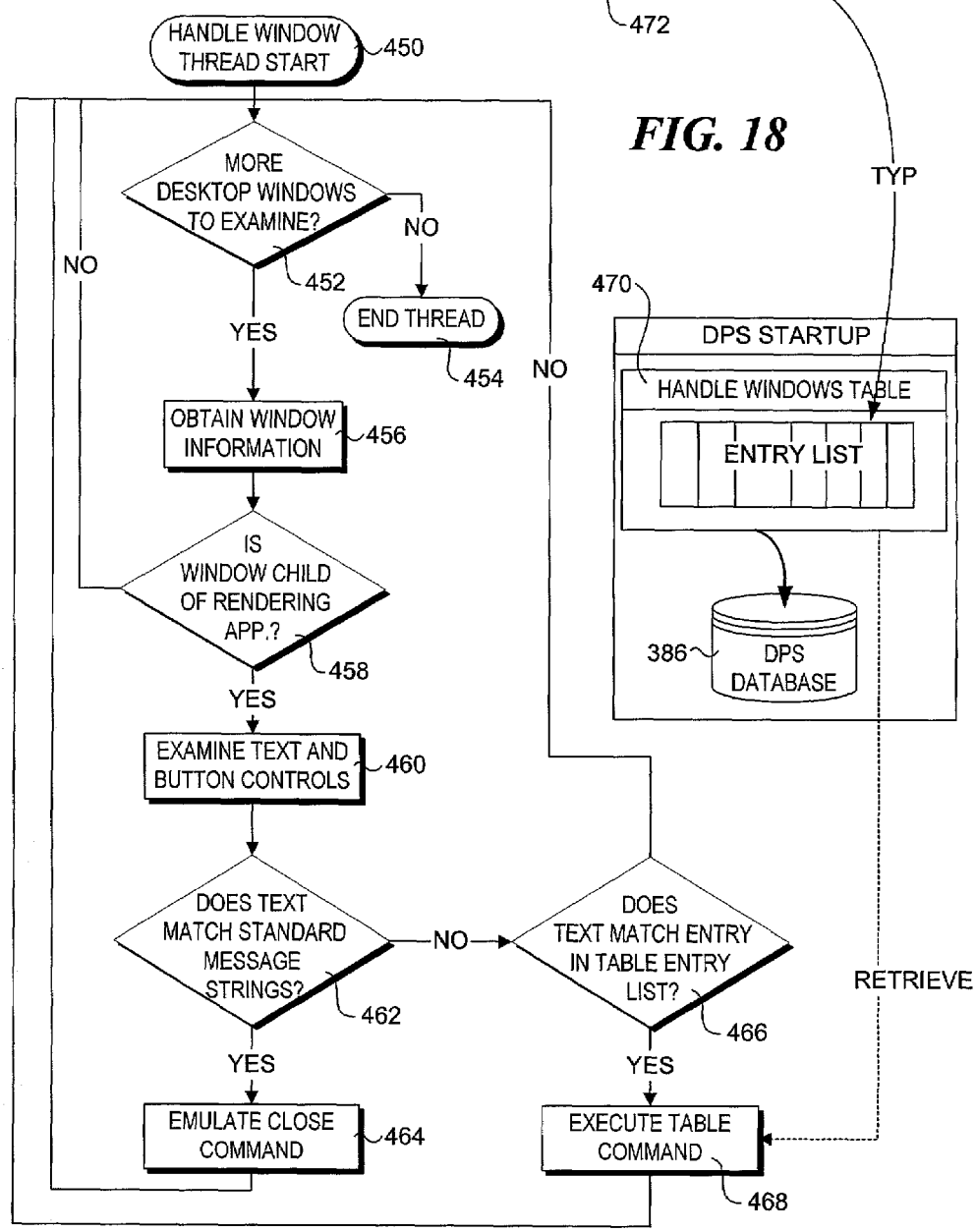
FIG. 18 is a flowchart and schematic diagram illustrating the operations and logic employed by a Handle Windows component to handle various dialog and message boxes that may be launched during when processing a print job.

A flowchart detailing the logic and operations provided by Handle Windows component 224 is shown in FIG. 18. As shown by start blocks 450 in FIG. 16, a Handle Windows thread is launched at the start of decision block 354 and immediately after the print action has been invoked in block 360. As discussed above, the Handle Windows component is used to handle various dialog and messaged boxes that may be launched when an application is loaded, when a document is loaded into an application, when a print action is initiated, during the printing process, etc.

Returning to the flowchart of FIG. 18, upon being launched, the Handle Window thread makes a determination to whether there are any more desktop windows to examine in a block 452. Such windows will generally include dialog boxes and message boxes. If there are no more windows to examine, the thread is ended, as depicted by and end thread end block 454. If there are more windows to examine, the logic proceeds to a block 456 in which window information for a window is obtained. Under MS Windows operating systems, window information may be obtained by making an appropriate Windows API call.

Next, in a decision block 458 a determination is made to whether the window is a child window of a rendering application (i.e., was it produced by a supplemental application or a browser). If the decision is no, the window does not correspond to the rendering application, and the logic proceeds to decision block 452 to evaluate the next window. If the answer to decision block 458 is Yes (TRUE), the logic proceeds to a block 460 in which text and control buttons for the window are examined.

As determined by a decision block 462, if the text matches a standard message string the logic proceeds to a block 464 in which a window close command is internally provided to emulate a user activating either a close button on the window or the window close icon in the window's frame. The logic then returns to decision block 452 to process the next window.

If the text does not match a standard message string, the answer to decision block 462 is No (FALSE), and the logic proceeds to a decision block 466 in which a determination is made to whether the text matches a corresponding an entry list MessageText value stored in a Handle Windows Table 470 in DPS database 386. If there is a matching value, the logic proceeds to a block 468 in which the table command is executed by retrieving the data in the row of the matching MessageText value and issuing a corresponding message to the Windows API based on the parameters provided by the data. For example, a typical entry list row 472 is shown at the top of FIGURE 472. The row contains information pertinent to the Windows API, including a MessageID, Wparam, and Lparam value. These parameters are used to make a corresponding API call to effectuate the desired operation for handling the window. Once the table command is executed, or if the answer to decision block 466 is No (FALSE), the logic returns to decision block 452 to begin processing the next window.

In the foregoing description and accompanying drawings, embodiments of the invention that implement software operations provided by MS Windows operating system components were disclosed. This is not meant to be limiting, as the principles and teaching of the invention may be applied to implementation in which other operating systems are used, such as UNIX-based operating systems and LINUX-based operating systems. For example, various UNIX and LINUX operating systems provide graphical user interfaces, application API's and printing capabilities that are supported by OS kernel components that provide similar operations to the MS Windows printing support components discussed above (e.g., Windows GDI, print spooler, printer drivers, etc.)

EXEMPLARY FILE SERVER COMPUTER SYSTEM

Figure 19:
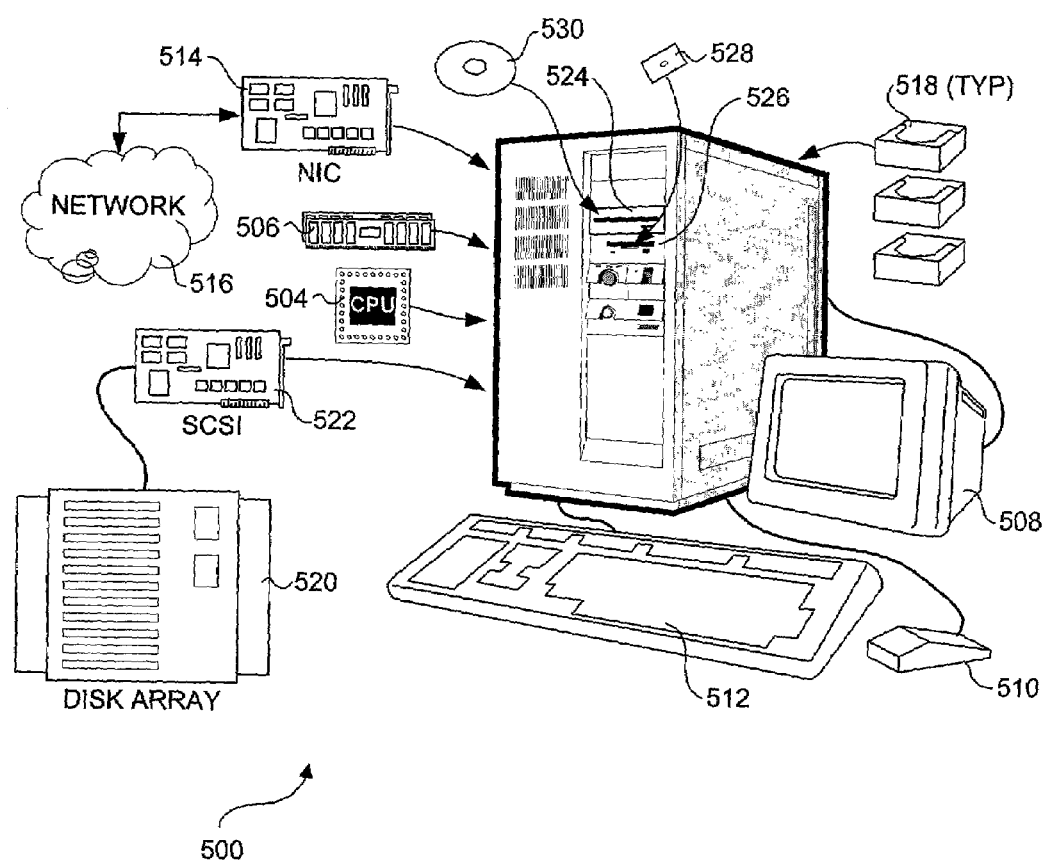
FIG. 19 is a schematic diagram of an exemplary computer server that may be used to host a driverless print server installation.

With reference to FIG. 19, a generally conventional computer server 500 is illustrated, which is suitable for use in connection with practicing the present invention, and may be used for the DPS server computer and Web server computer where a separate computer is used for performing Web server operating. . Examples of computer systems that may be suitable for these purposes include computer servers operating Microsoft Windows, UNIX-based, and LINUX-based operating systems.

Computer server 500 includes a chassis 502 in which is mounted a motherboard (not shown) populated with appropriate integrated circuits, including one or more processors 504 and memory (e.g., DIMMs or SIMMs) 506, as is generally well known to those of ordinary skill in the art. A monitor 508 is included for displaying graphics and text generated by software programs and program modules that are run by the computer server. A mouse 510 (or other pointing device) may be connected to a serial port (or to a bus port or USB port) on the rear of chassis 502, and signals from mouse 510 are conveyed to the motherboard to control a cursor on the display and to select text, menu options, and graphic components displayed on monitor 508 by software programs and modules executing on the computer. In addition, a keyboard 512 is coupled to the motherboard for user entry of text and commands that affect the running of software programs executing on the computer. Computer server 500 also includes a network interface card (NIC) 514, or equivalent circuitry built into the motherboard to enable the server to send and receive data via a network 516.

File system storage corresponding to the invention may be implemented via a plurality of hard disks 518 that are stored internally within chassis 502, and/or via a plurality of hard disks that are stored in an external disk array 520 that may be accessed via a SCSI card 522 or equivalent SCSI circuitry built into the motherboard. Optionally, disk array 520 may be accessed using a Fibre Channel link using an appropriate Fibre Channel interface card (not shown) or built-in circuitry.

Computer server 500 generally may include a compact disk-read only memory (CD-ROM) drive 524 into which a CD-ROM disk may be inserted so that executable files and data on the disk can be read for transfer into memory 506 and/or into storage on hard disk 518. Similarly, a floppy drive 526 may be provided for such purposes. Other mass memory storage devices such as an optical recorded medium or DVD drive may also be included. The machine instructions comprising the software programs, components, and modules that causes processor(s) 204 to implement the operations of the present invention that have been discussed above will typically be distributed on floppy disks 528 or CD-ROMs 530 (or other memory media) and stored on one or more hard disks 518 until loaded into memory 506 for execution by processor(s) 504. Optionally, the machine instructions may be loaded via network 516 as a carrier wave file.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method to enable a user to print source data on a target printer via an e-mail message, comprising:
    defining a virtual e-mail address for the target printer;
    retrieving an e-mail message containing the source data that is addressed to the virtual e-mail address of the target printer from an e-mail server that hosts an e-mail account corresponding to the virtual e-mail address, at least a portion of the source data comprising an attachment to the e-mail message;
    separating the attachment from the e-mail message;
    determining one of a corresponding application or browser via which the attachment can be rendered based on a content type of the attachment;
    loading the attachment into the corresponding application or browser running on a print server from which the attachment can be printed;
    generating printer data corresponding to the attachment via the corresponding application or browser and print subsystem of an operating system running on the print server; and
    submitting the printer data from the print server to the target printer.

2. The method of claim 1, wherein the source data further includes a main body of the e-mail message, and the method further comprises the operations of:
    loading the e-mail message into an e-mail application running on the print server; and
    generating printer data corresponding to the e-mail message via the e-mail application in combination with a print subsystem.

3. The method of claim 1, wherein the attachment comprises an image file that is loaded into a browser running on the print server to render an image corresponding to the image file and submit graphical data pertaining to the image to the print subsystem to generate the printer data.

4. The method of claim 1, wherein an application may display message boxes and/or dialogs during an application printing process to inform a user of an error or warning or gather print parameter information from a user, further comprising automatically providing computer-generated input to handle any message boxes and/or dialogs that are invoked by the application when generating the printer data.

5. The method of claim 1, wherein an appropriate application to load for the attachment is determined by performing the operations of:

defining file type-to-application mapping information that maps each of a plurality of source data file types to one or more corresponding applications that may be used to load source data having that file type;

determining a file type of the attachment; and determining an appropriate application to load on the print server to open the source data based on the file type and the file type-to-application mapping information.

6. The method of claim 5, further comprising providing a user interface to enable an administrator to define the file type-to-application mapping information and define application loading information to enable the applications to be loaded on the print server.

7. The method of claim 6, wherein the user interface comprises a web page served from a web server operatively coupled to the print server.

8. The method of claim 1, wherein the source data comprise a main body of the e-mail message and at least one attachment to the e-mail message, and the method further comprises the operations of:

generating a file for each of the main body and said at least one attachment; and for each file, determining whether the file corresponds to the main body, and if it does, loading the e-mail message into an e-mail application and invoking a print operation to cause printer data corresponding to the e-mail message to be generated via the e-mail application in combination with the print subsystem;

otherwise, if the file corresponds to an attachment, loading an application on the print server from which the attachment can be printed, loading the attachment into the application, and invoking a print operation to cause the application to generate printer data corresponding to the attachment via the application in combination with the print subsystem.

9. The method of claim 8, further comprising:

generating a print job request for each file; and storing the print job requests in a print job queue.

10. The method of claim 1, further comprising polling the e-mail server to see if any e-mail messages have been received by the e-mail server that were addressed to the virtual printer e-mail address.

11. The method of claim 1, further comprising invoking a trigger mechanism when an e-mail message addressed to the virtual printer e-mail address is received by the e-mail server, said trigger mechanism initiating retrieval of the e-mail message from the e-mail server.

12. The method of claim 1, further comprising sending a reply e-mail message back to an e-mail account by which the e-mail message containing the source data was sent, said reply e-mail message including print status information.

13. The method of claim 1, further comprising providing a Web-based user interface that enables an administrator to view information pertaining to pending print jobs for the print server.

14. The method of claim 1, further comprising providing a Web-based user interface that enables an administrator to view information pertaining to completed print jobs for the print server.

15. The method of claim 14, wherein the Web-based user interface enables the administrator to view completed print requests using a filter based on at least one of a date range, a specified owner, an account, and a specified printer.

16. The method of claim 14, wherein the Web-based user interface enables the administrator to view completed print requests using a filter that is generated in response to a plurality of search criteria entered by the administrator via the Web-based user interface.

17. The method of claim 1, wherein the operations of loading the source data and generating the printer data are performed using an operating system shell extension print mechanism.

18. A machine readable media on which a plurality of machine instructions are stored that when executed by a computing machine enable a user to print source data on a target printer via an e-mail message by performing the operations of:

retrieving an e-mail message containing the source data that is addressed to a virtual e-mail address defined for the target printer from an e-mail server that host an e-mail account corresponding to the virtual e-mail address, at least a portion of the source data comprising an attachment to the e-mail message;

separating the attachment from the e-nail message;

determining one of a corresponding application or browser via which the attachment can be rendered based on a content type of the attachment;

loading the attachment into the corresponding application or browser running on a print server from which the attachment can be printed;

generating printer data corresponding to the attachment via the corresponding application or browser and print subsystem of an operating system running on the print server; and submitting the printer data from the print server to the target printer.

19. The machine-readable media of claim 18, wherein execution of the machine instructions further performs the operation of providing a user-interface to enable a user to define a virtual e-mail address for the target printer.

20. The machine readable media of claim 18, wherein the source data comprise a main body of the e-mail message, and execution of the machine instructions further performs the operations of:

loading the e-mail message into an e-mail application running on the print server; and generating printer data corresponding to the e-mail message via the e-mail application in combination with the print subsystem.

21. The machine readable media of claim 18, wherein the attachment comprises an image file that is loaded into a browser running on the print server to render an image corresponding to the image file and submit graphical data pertaining to the image to the print subsystem to generate the printer data.

22. The machine readable media of claim 18, wherein an application may display message boxes and/or dialogs during an application printing process to inform a user of an error or warning or gather print parameter information from a user, and execution of the machine instructions further performs the operation of automatically providing computer-generated input to handle any message boxes and/or dialogs that are invoked by the application when generating the printer data.

23. The machine readable media of claim 18, wherein execution of the machine instructions determines an appropriate application to load for the attachment by performing the operations of:

retrieving file type-to-application mapping information that maps each of a plurality of source data file types to one or more corresponding applications that may be used to load source data having that file type;

determining a file type of the attachment; and determining an appropriate application to load on the print server to open the source data based on the file type and the file type-to-application mapping information.

24. The machine readable media of claim 23, wherein execution of the machine instructions further performs the operation of providing a user interface to enable an administrator to define the file type-to-application mapping information and define application loading information to enable the applications to be loaded on the print server.

25. The machine readable media of claim 24, wherein a portion of the machine instructions comprise a web server component and the user interface comprises a web page served via the web server component.

26. The machine readable media of claim 18, wherein the source data comprise a main body of the e-mail message and at least one attachment to the e-mail message, and execution of the machine instructions further performs the operations of:
  generating a file for each of the main body and said at least one attachment; and for each file,
    determining whether the file corresponds to the main body, and if it does,
      loading the e-mail message into an e-mail application and generating printer data corresponding to the e-mail message via the e-mail application in combination with a print subsystem of an operating system running on the print server;
    otherwise, if the file corresponds to an attachment,
      loading an application on the print server from which the attachment can be printed, loading the attachment into the application, and initiating a print action for the application to generate printer data corresponding to the attachment via the application in combination with the print subsystem.

27. The machine readable media of claim 18, wherein execution of the machine instructions further performs the operation of polling the e-mail server to see if any e-mail messages have been received by the e-mail server that were addressed to the virtual printer e-mail address.

28. The machine readable media of claim 18, wherein execution of the machine instructions further performs the operation of sending a reply e-mail message back to an e-mail account by which the e-mail message containing the source data was sent, said reply e-mail message including print status information.

29. The machine readable media of claim 18, wherein execution of the machine instructions further performs the operation of providing a Web-based user interface that enables an administrator to view information pertaining to pending print jobs for the print server.

30. The machine readable media of claim 18, wherein execution of the machine instructions further performs the operation of providing a Web-based user interface that enables an administrator to view information pertaining to completed print jobs for the print server.

31. The machine readable media of claim 30, wherein the Web-based user interface enables the administrator to view completed print requests using a filter based on at least one of a date range, a specified owner, an account, and a specified printer.

32. The machine readable media of claim 30, wherein the Web-based user interface enables the administrator to view completed print requests using a filter that is generated in response to a plurality of search criteria entered by the administrator view the Web-based user interface.

33. The machine-readable media of claim 18, wherein the operations of loading the source data and generating the printer data are performed using an operating system shell extension print mechanism.

34. A system to enable a user to print source data on a target printer via an e-mail message, comprising:
  means for retrieving an e-mail message containing the source data that is addressed to a virtual e-mail address defined for the target printer from an e-mail server that hosts an e-mail account corresponding to the virtual e-mail address, at least a portion of the source data comprising an attachment to the e-mail message;
  means for separating the attachment from the e-mail message;
  means for determining one of a corresponding application or browser via which the attachment can be rendered based on a content type of the attachment;
  means for loading the attachment into the corresponding application or browser running on a print server from which the attachment can be printed;
  means for invoking a print action within the corresponding application or browser to generate printer data corresponding to the attachment via the corresponding application or browser and a print subsystem of an operating system running on the print server; and
  means for submitting the printer data from the print server to the target printer.

35. The system of claim 34, further comprising means for providing a user-interface to enable a user to define a virtual e-mail address for the target printer.

36. The system of claim 34, wherein the source data further includes a main body of the e-mail message, and the system further comprises:
  means for loading the e-mail message into an e-mail application running on the print server; and
  means for invoking a print action to generate printer data corresponding to the e-mail message via the e-mail application in combination with the print subsystem.

37. The system of claim 34, wherein the attachment comprises an image file that is loaded into a browser running on the print server to render an image corresponding to the image file and submit graphical data pertaining to the image to the operating system print subsystem to generate the printer data.

38. The system of claim 34, wherein an application may display message boxes and/or dialogs during an application printing process to inform a user of an error or warning or gather print parameter information from a user, and the system further comprises means for automatically providing computer-generated input to handle any message boxes and/or dialogs that are launched by the application when generating the printer data.

39. The system of claim 34, wherein the means for loading the corresponding application or browser determines an appropriate application to load for the attachment by performing the operations of:
  retrieving file type-to-application mapping information that maps each of a plurality of source data file types to one or more corresponding applications that may be used to load source data having that file type;
  determining a file type of the attachment; and
  determining an appropriate application to load on the print server to open the source data based on the file type and the file type-to-application mapping information.

40. The system of claim 39, further comprising means for providing a user interface to enable an administrator to define the file type-to-application mapping information and define application loading information to enable the applications to be loaded on the print server.

41. The system of claim 40, further comprising a Web server means for serving Web pages, wherein the user interface comprises a Web page served by the Web server means.

42. The system of claim 34, wherein the source data comprise a main body of the e-mail message and at least one attachment to the e-mail message, and the system further performs the operations of:
  generating a file for each of the main body and said at least one attachment; and for each file,
    determining whether the file corresponds to the main body, and if it does,
      loading the e-mail message into an e-mail application and generating printer data corresponding to the e-mail message via the e-mail application in combination with a print subsystem of an operating system running on the print server;
    otherwise, if the file corresponds to an attachment,
      loading an application on the print server from which the attachment can be printed, loading the attachment into the application, and executing a print action for the application to generate printer data corresponding to the attachment via the application in combination with the print subsystem.

43. The system of claim 34, further comprising means for polling the e-mail server to see if any e-mail messages have been received by the e-mail server that were addressed to the virtual printer e-mail address.

44. The system of claim 34, further comprising means for sending a reply e-mail message back to an e-mail account by which the e-mail message containing the source data was sent, said reply e-mail message including print status information.

45. The system of claim 34, further comprising means for providing a Web-based user interface that enables an administrator to view information pertaining to pending print jobs for the print server.

46. The system of claim 34, further comprising means for providing a Web-based user interface that enables an administrator to view information pertaining to completed print jobs for the print server.

47. The system of claim 46, wherein the Web-based user interface enables the administrator to view completed print requests using a filter based on at least one of a date range, a specified owner, an account, and a specified printer.

48. The system of claim 46, wherein the Web-based user interface enables the administrator to view completed print requests using a filter that is generated in response to a plurality of search criteria entered by the administrator view the Web-based user interface.

* * * * *

UNITED STATES PATENT AND TRADEMARK OFFICE
CERTIFICATE OF CORRECTION

PATENT NO. : 6,993,562 B2 Page 1 of 1
APPLICATION NO. : 10/104528
DATED : January 31, 2006
INVENTOR(S) : Treptow et al.

It is certified that error appears in the above-identified patent and that said Letters Patent is hereby corrected as shown below:

Col. 22 in Claim 18, Line 18, please delete "e-nail" and insert -- e-mail --.

Signed and Sealed this

Eighteenth Day of September, 2007

JON W. DUDAS
*Director of the United States Patent and Trademark Office*